US008712685B2

(12) United States Patent
Hattori et al.

(10) Patent No.: US 8,712,685 B2
(45) Date of Patent: Apr. 29, 2014

(54) INFORMATION PROCESSING APPARATUS, NON-TRANSITORY COMPUTER-READABLE RECORDING MEDIUM, AND INFORMATION PROCESSING METHOD

(75) Inventors: Hiroyuki Hattori, Kanagawa (JP); Kimitake Hasuike, Kanagawa (JP); Reina Kikuchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/572,306

(22) Filed: Aug. 10, 2012

(65) Prior Publication Data

US 2013/0197802 A1     Aug. 1, 2013

(30) Foreign Application Priority Data

Jan. 26, 2012  (JP) ................................. 2012-014615

(51) Int. Cl.
*G01C 21/00*  (2006.01)
*G01C 11/00*  (2006.01)
*G01C 11/02*  (2006.01)
*G01C 11/04*  (2006.01)
*G01C 11/06*  (2006.01)
*G01C 11/08*  (2006.01)

(52) U.S. Cl.
USPC ............... 701/428; 701/25; 701/26; 701/419; 701/421; 701/431; 701/439; 701/441; 701/498; 701/516; 715/716; 715/727; 715/728; 715/730

(58) Field of Classification Search
CPC ........ G01C 11/00; G01C 11/02; G01C 11/04; G01C 11/06; G01C 11/08; G01C 21/00; G01C 25/00; G06T 1/00
USPC ............. 701/25–26, 419, 421, 428, 431, 439, 701/441, 498, 516; 715/716, 727–728, 730
See application file for complete search history.

(56) References Cited

U.S. PATENT DOCUMENTS

| 5,614,898 | A | 3/1997 | Kamiya et al. | |
|---|---|---|---|---|
| 7,103,475 | B2 * | 9/2006 | Irie | 701/431 |
| 7,139,820 | B1 * | 11/2006 | O'Toole et al. | 709/223 |
| 7,805,240 | B2 * | 9/2010 | Naitou et al. | 701/33.7 |
| 8,073,565 | B2 * | 12/2011 | Johnson | 700/245 |
| 2001/0056443 | A1 | 12/2001 | Takayama et al. | |

(Continued)

FOREIGN PATENT DOCUMENTS

| JP | A-7-326000 | 12/1995 |
|---|---|---|
| JP | B2-2952173 | 9/1999 |

(Continued)

*Primary Examiner* — Mary Cheung
*Assistant Examiner* — Atul Trivedi
(74) *Attorney, Agent, or Firm* — Oliff PLC

(57) ABSTRACT

An information processing apparatus includes a position detecting unit detecting a position, an explanation information storage unit storing explanation position information and explanation information, a generation unit extracting the explanation information corresponding to a first explanation position from the explanation information storage unit and generating the extracted explanation information with a sound when the first explanation position is detected within a first distance from the detected position, and a group determining unit determining whether or not the first explanation position belongs to the same group as a second explanation position when the second explanation position is detected within the first distance from the detected position after the generation unit starts the generating of the explanation information corresponding to the first explanation position with a sound, wherein the generation unit continues to reproduce the explanation information with a sound when both explanation positions belong to the same group.

11 Claims, 24 Drawing Sheets

(56) References Cited

U.S. PATENT DOCUMENTS

| | | |
|---|---|---|
| 2002/0077910 A1 | 6/2002 | Shioda et al. |
| 2002/0099499 A1 | 7/2002 | Takayama et al. |
| 2002/0103597 A1* | 8/2002 | Takayama et al. ............ 701/200 |
| 2002/0167442 A1 | 11/2002 | Taylor |
| 2004/0036649 A1 | 2/2004 | Taylor |
| 2004/0186663 A1* | 9/2004 | Irie ............................... 701/211 |
| 2006/0074552 A1* | 4/2006 | Naito et al. ................... 701/211 |
| 2006/0284767 A1 | 12/2006 | Taylor |
| 2007/0001875 A1 | 1/2007 | Taylor |
| 2008/0024360 A1 | 1/2008 | Taylor |
| 2008/0024364 A1 | 1/2008 | Frederick Taylor |
| 2009/0060604 A1* | 3/2009 | Hattori et al. ................. 399/361 |
| 2009/0143979 A1* | 6/2009 | Sakata .......................... 701/201 |
| 2010/0179756 A1* | 7/2010 | Higgins et al. ................ 701/210 |

FOREIGN PATENT DOCUMENTS

| | | |
|---|---|---|
| JP | A-2000-215211 | 8/2000 |
| JP | B2-3548459 | 7/2004 |
| JP | B2-3811071 | 8/2006 |
| JP | B2-3884418 | 2/2007 |
| JP | B2-3963234 | 8/2007 |
| JP | B2-4174177 | 10/2008 |
| JP | B2-4362123 | 11/2009 |
| JP | A-2011-242688 | 12/2011 |

* cited by examiner

FIG. 14

| ATTRIBUTE | STANDBY TIME A | STANDBY A (BGM) | STANDBY TIME B | STANDBY B (BGM) |
|---|---|---|---|---|
| P1 | 3 | xxx | 30 | xxx |
| P2 | 4 | yyy | 33 | zzz |
| P1 | 3 | xxx | 45 | xxx |
| P2 | 4 | zzz | 48 | yyy |
| ... | ... | ... | ... | ... |

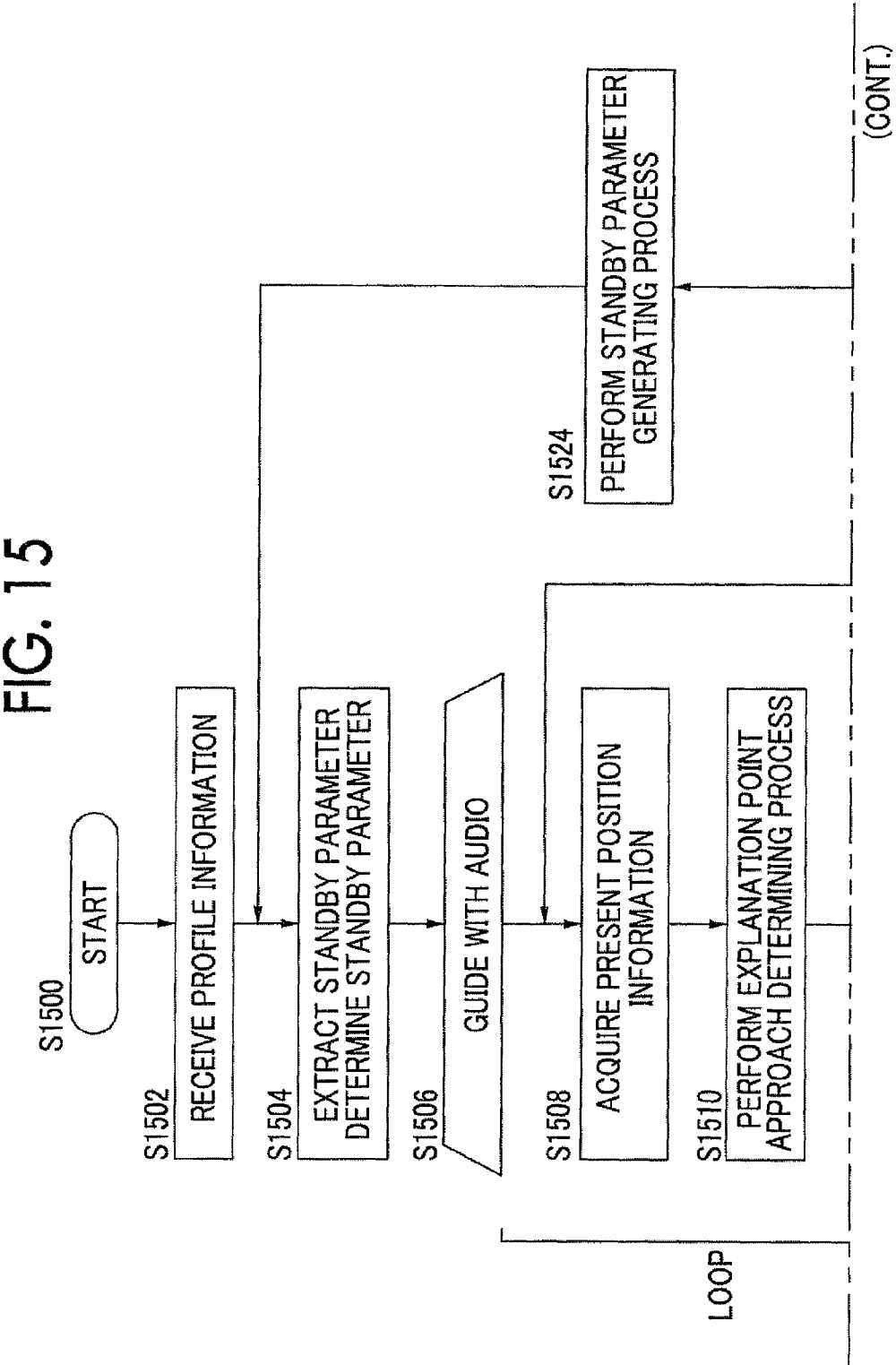

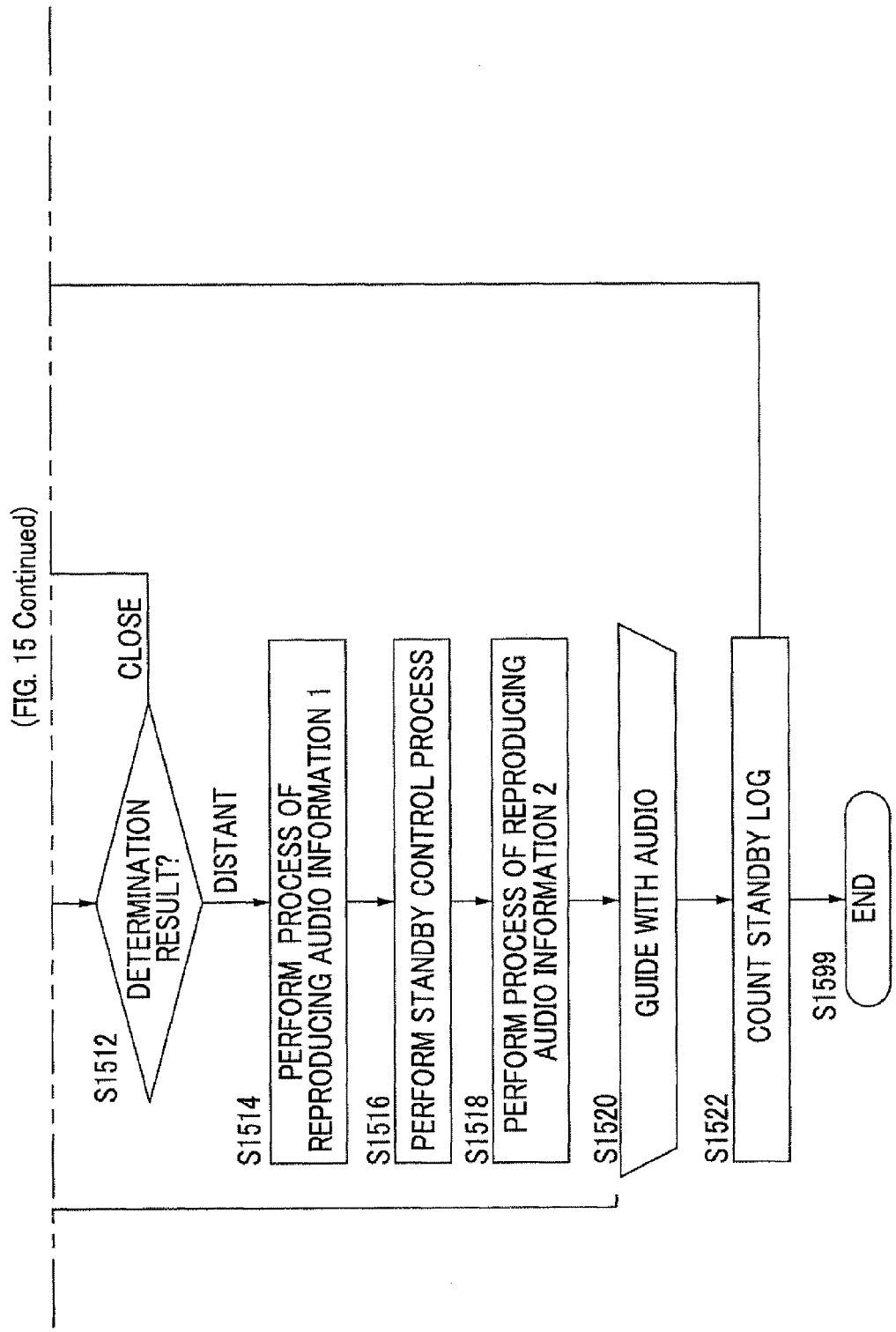

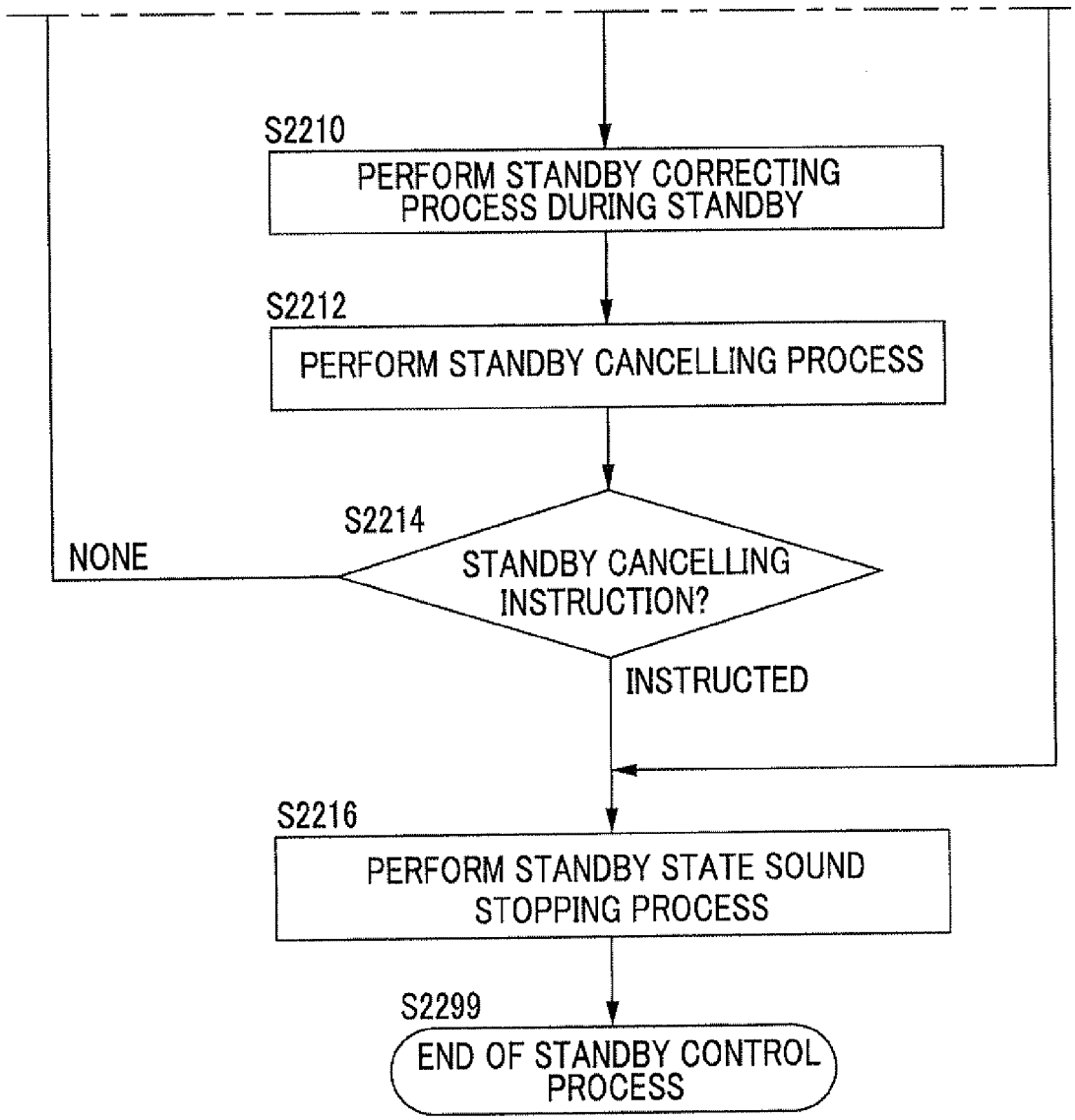

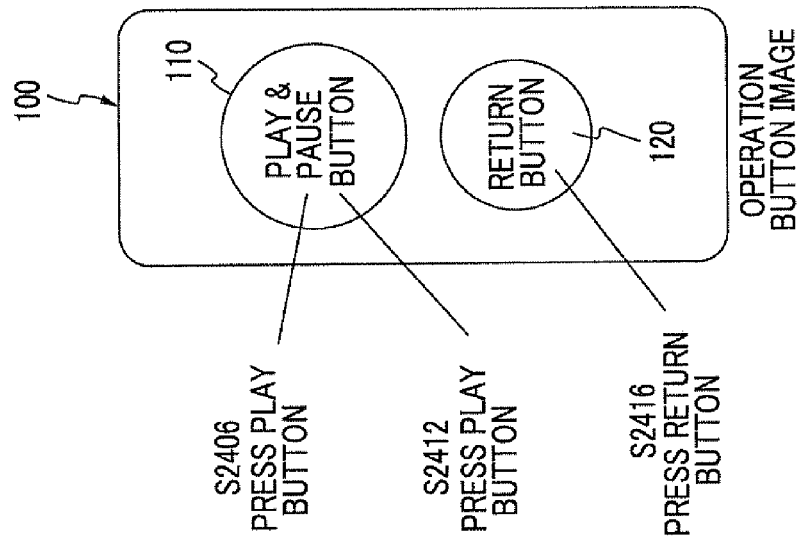
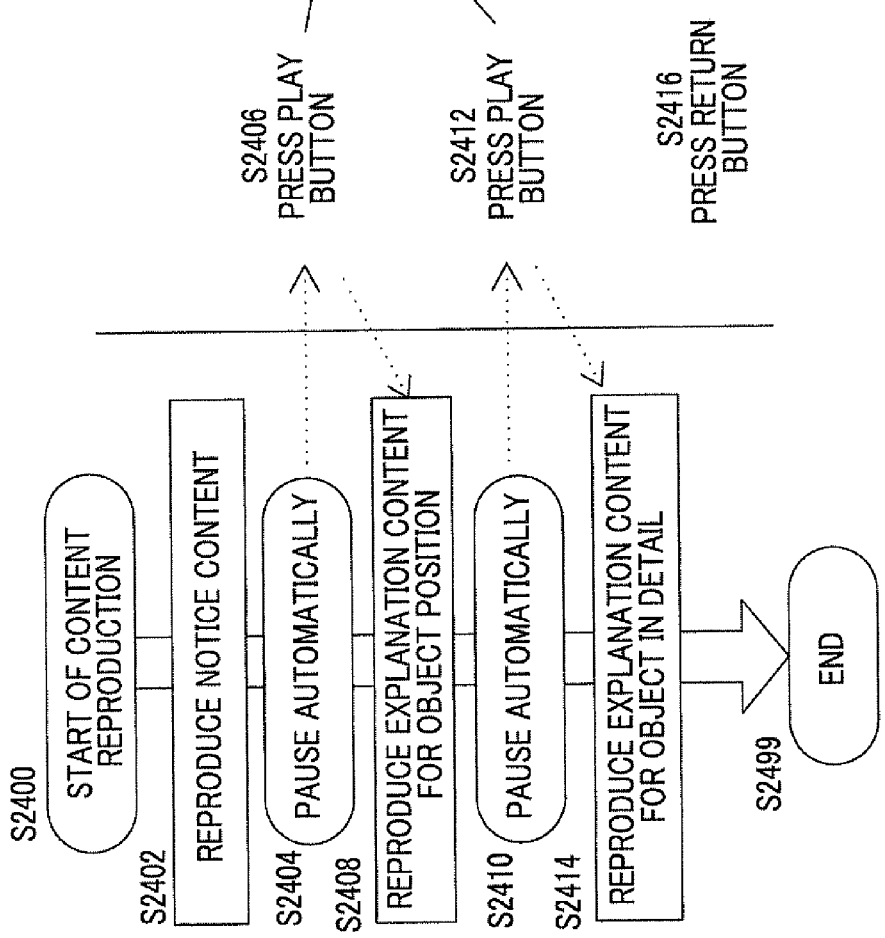

US 8,712,685 B2

INFORMATION PROCESSING APPARATUS, NON-TRANSITORY COMPUTER-READABLE RECORDING MEDIUM, AND INFORMATION PROCESSING METHOD

CROSS-REFERENCE TO RELATED APPLICATIONS

This application is based on and claims priority under 35 USC 119 from Japanese Patent Application No. 2012-014615 filed Jan. 26, 2012.

BACKGROUND

Technical Field

The present invention relates to an information processing apparatus, a non-transitory computer-readable recording medium having recorded thereon an information processing program, and an information processing method.

SUMMARY

The invention provides the following aspects to achieve the above-mentioned object.

According to an aspect of the invention, there is provided an information processing apparatus including: a position detecting unit that detects a position of the information processing apparatus; an explanation information storage unit that stores explanation position information which is information of a position to be explained and explanation information to correspond to each other; a generation unit that extracts the explanation information corresponding to a first explanation position from the explanation information storage unit and reproduces the extracted explanation information with a sound when the first explanation position which is a position to be explained is detected within a first distance which is a predetermined distance from the position detected by the position detecting unit; and a group determining unit that determines whether or not the first explanation position belongs to the same group as a second explanation position when the second explanation position which is a position to be explained and which is a position different from the first explanation position is detected within the first distance from the position detected by the position detecting unit after the generation unit starts the generating of the explanation information corresponding to the first explanation position with a sound, wherein the generation unit continues to reproduce the explanation information with a sound when the group determining unit determines that both explanation positions belong to the same group.

BRIEF DESCRIPTION OF THE DRAWINGS

Exemplary embodiments of the present invention will be described in detail based on the following figures, wherein:

FIG. 14 is a diagram illustrating an example of the data configuration of a standby parameter table;

FIG. 15 is a flowchart illustrating the flow of processes in the second exemplary embodiment;

FIGS. 24A and 24B are diagrams illustrating an example of the relationship between operations and processes.

DETAILED DESCRIPTION

Hereinafter, various exemplary embodiments of the invention will be described with reference to the accompanying drawings.

Figure 1:
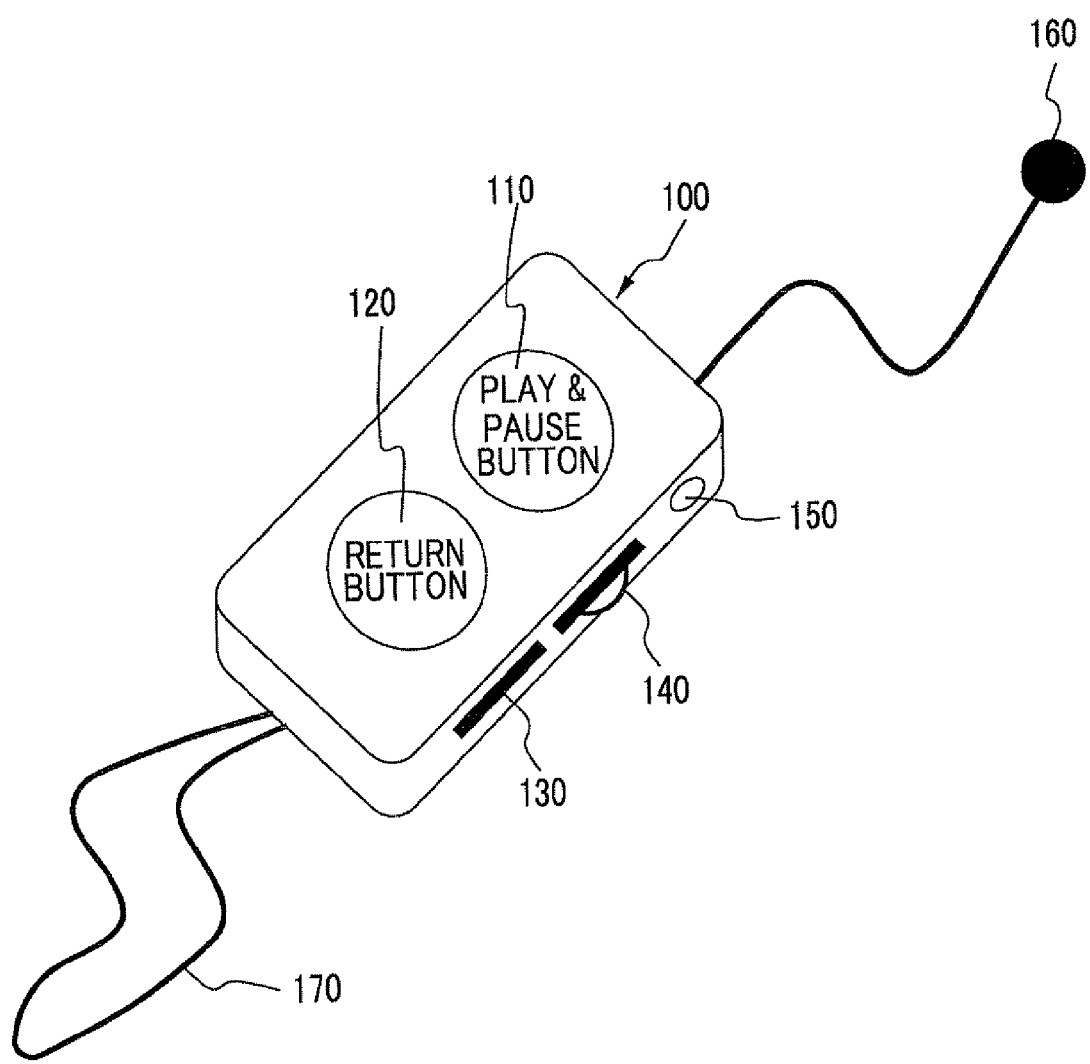
FIG. 1 is a diagram illustrating an appearance of an information terminal.

FIG. 1 is a diagram illustrating the appearance of an information terminal 100 according to an exemplary embodiment (including a first exemplary embodiment and a second exemplary embodiment) of the invention.

The information terminal 100 includes a play & pause button 110, a return button 120, a memory card insertion slit 130, a volume tuner 140, a power button 150, an earphone 160, and a strap 170.

The information terminal 100 is a portable device and serves to divide and output an explanation of an object plural times with a sound by an operator's operation or under the control of an audio content control module 350, a control module 1200, and the like to be described later in the information terminal 100. Accordingly, a standby occurs as a time interval until a subsequent explanation (second explanation) is started after a certain explanation (first explanation) is finished. The information terminal 100 may be used, for example, as a tourist guiding device used for an operator to walk around a tourist resort or a guide device explaining works of art in an art gallery.

The play & pause button 110 is a button which may be operated by an operator. By pressing the play & pause button, it is instructed to reproduce an explanatory sound when the explanatory sound is not reproduced, and it is instructed to stop the reproduction of an explanatory sound when the explanatory sound is reproduced.

The return button 120 is a button which may be operated by an operator. When the button is pressed, it is instructed to reproduce an explanatory sound reproduced just before. When the button is pressed while reproducing an explanatory sound, it is instructed to reproduce the explanatory sound from the initial part.

A memory card storing a program according to this exemplary embodiment, information on a standby (hereinafter, referred to as standby information) to be described later, audio contents, and the like is inserted into the memory card insertion slit 130. Through the use of the memory card insertion slit, such information is read or information such as an operation history of the information terminal 100 is recorded on the memory card. Here, the audio contents are information for generating a sound and examples thereof include information on an explanation (hereinafter, referred to as "explanation information"), music as BGM, and sound effects.

The volume tuner 140 may be operated by an operator and serves to adjust the volume of an explanatory sound.

The power button 150 is a button which may be operated by an operator and serves to turn on or off the power supply of the information terminal 100.

The earphone 160 outputs an explanatory sound. Instead of an earphone type, a headset type or a speaker type may be used.

The strap 170 is a cord hooked on an operator's arm.

The information terminal may be a general-purpose information terminal instead of the dedicated information terminal 100 as shown in FIG. 1. For example, a general-purpose information terminal having a touch panel display may be covered with a cover having two operating holes and the information terminal may be operated through the two operating holes. That is, a touch panel display may be covered with a cover allowing a play & pause button display area and a return button display area, which have the same functions as the play & pause button 110 and the return button 120 shown in FIG. 1, to be displayed on the touch panel display so as to operate only the display areas.

Figure 2:
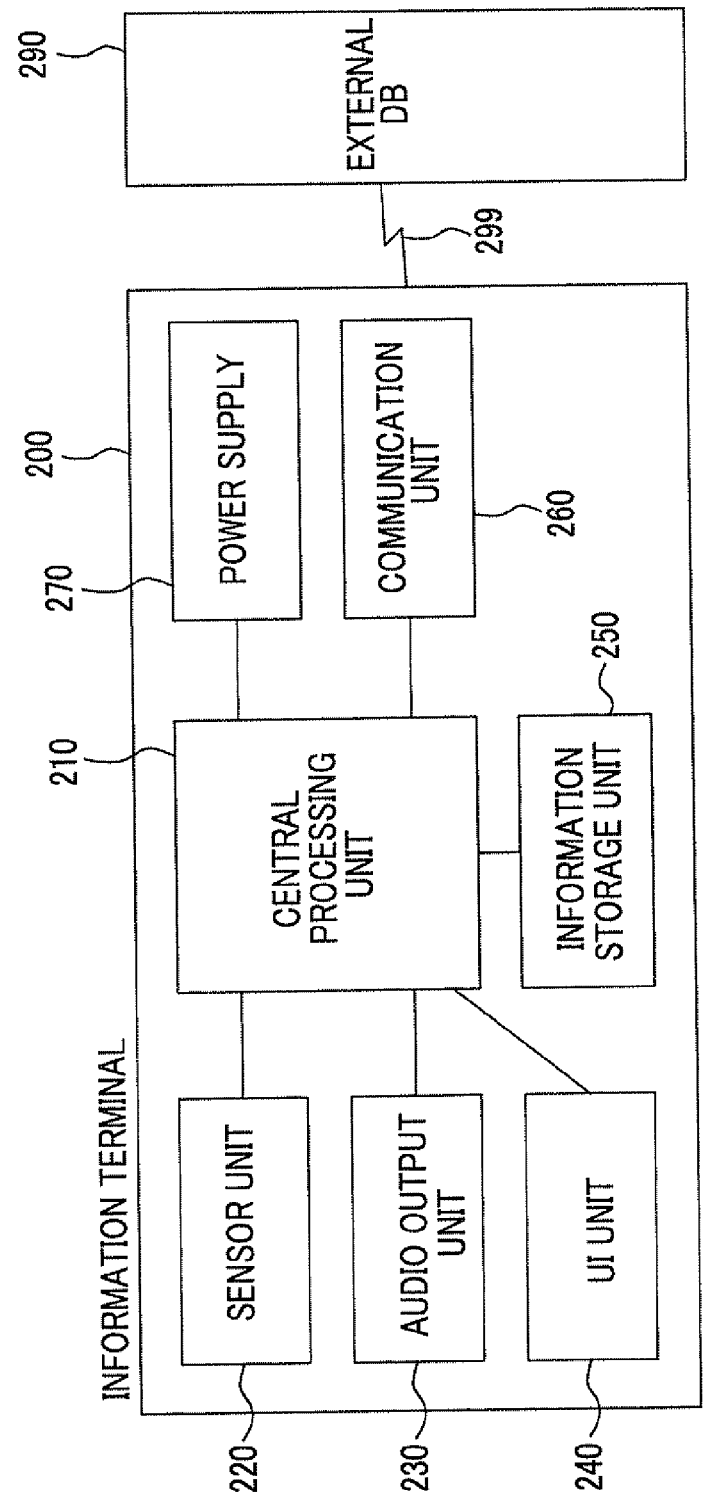
FIG. 2 is a block diagram illustrating an example of a hardware configuration of a computer implementing an exemplary embodiment of the invention.

FIG. 2 is a block diagram illustrating an example of the hardware configuration of a computer embodying this exemplary embodiment. The information terminal 100 shown in FIG. 1 includes the hardware of the computer shown in FIG. 2.

The information terminal 200 and the external DB 290 are connected to each other via a communication line 299. Examples of the communication line 299 include Bluetooth (registered trademark) and mobile communications. The information terminal 100 may have a phone function in addition to a communication function. However, the communication function is not necessary, but may not be provided. The external DB 290 stores a program in this exemplary embodiment, a standby parameter, audio contents, and the like and may store them in an information storage unit 250 of the information terminal 200 via the communication line 299 and the communication unit 260. The external DB 290 may receive information on a operation history of the information terminal 100 or the like stored in the information storage unit 250 via the communication unit 260 and the communication line 299 and may store the received information.

The information terminal 200 includes a central processing unit 210, a sensor unit 220, an audio output unit 230, an UI unit 240, an information storage unit 250, a communication unit 260, and a power supply 270.

The central processing unit 210 is connected to the sensor unit 220, the audio output unit 230, the UI unit 240, the information storage unit 250, the communication unit 260, and the power supply 270 and controls the units. That is, the central processing unit executes programs of a distance setting module 330, a group determining module 340, and an audio content control module 350 shown in FIG. 3 and a control module 1200 shown in FIG. 12. Specifically, the central processing unit 210 is constructed by a so-called CPU (Central Processing Unit) or the like.

The sensor unit 220 is a sensor detecting an operator's state and examples thereof include an acceleration sensor, a terrestrial magnetic sensor, a sensor counting the number of steps, and a position sensor of a GPS (Global Positioning System) (one or a combination of the sensors). The sensor unit 220 may be included in the main body of the information terminal 100 or may be included in the earphone 160. When the sensor unit is included in the earphone 160, the sensor unit detects an operator's face state (for example, a posture directed to upside or downside or a nodding posture)

The audio output unit 230 corresponds to the earphone 160 and may be a headset or a speaker as described above.

The UI unit 290 corresponds to the play & pause button 110 and the return button 120 and detects an operator's operation.

The information storage unit 250 stores programs used by the central processing unit 210, a standby parameter, and audio contents. For example, the information storage unit downloads information from the external DB 290 and stores the information. Specifically, the information storage unit corresponds to a RAM (Random Access Memory), a ROM (Read Only Memory), and a memory card inserted into the memory card insertion slit 130.

The communication unit 260 communicates with the external DB 290 via the communication line 299. In addition, the communication unit may communicate with another information terminal 200.

The power supply 270 supplies power to the units of the information terminal 200.

In the exemplary embodiment employing a computer program, a computer program which is software is read by the system having this hardware configuration and the software and the hardware implement the exemplary embodiment in cooperation with each other.

The hardware configuration shown in FIG. 2 is only a configurational example, and this exemplary embodiment is not limited to the configuration shown in FIG. 2 as long as it can execute the modules described in this exemplary embodiment. For example, some modules may be constructed by dedicated hardware (for example, ASIC) and some modules may be connected in an external system via a communication line. Particularly, the modules may be mounted on a mobile phone, a portable digital music player, or the like.

Figure 3:
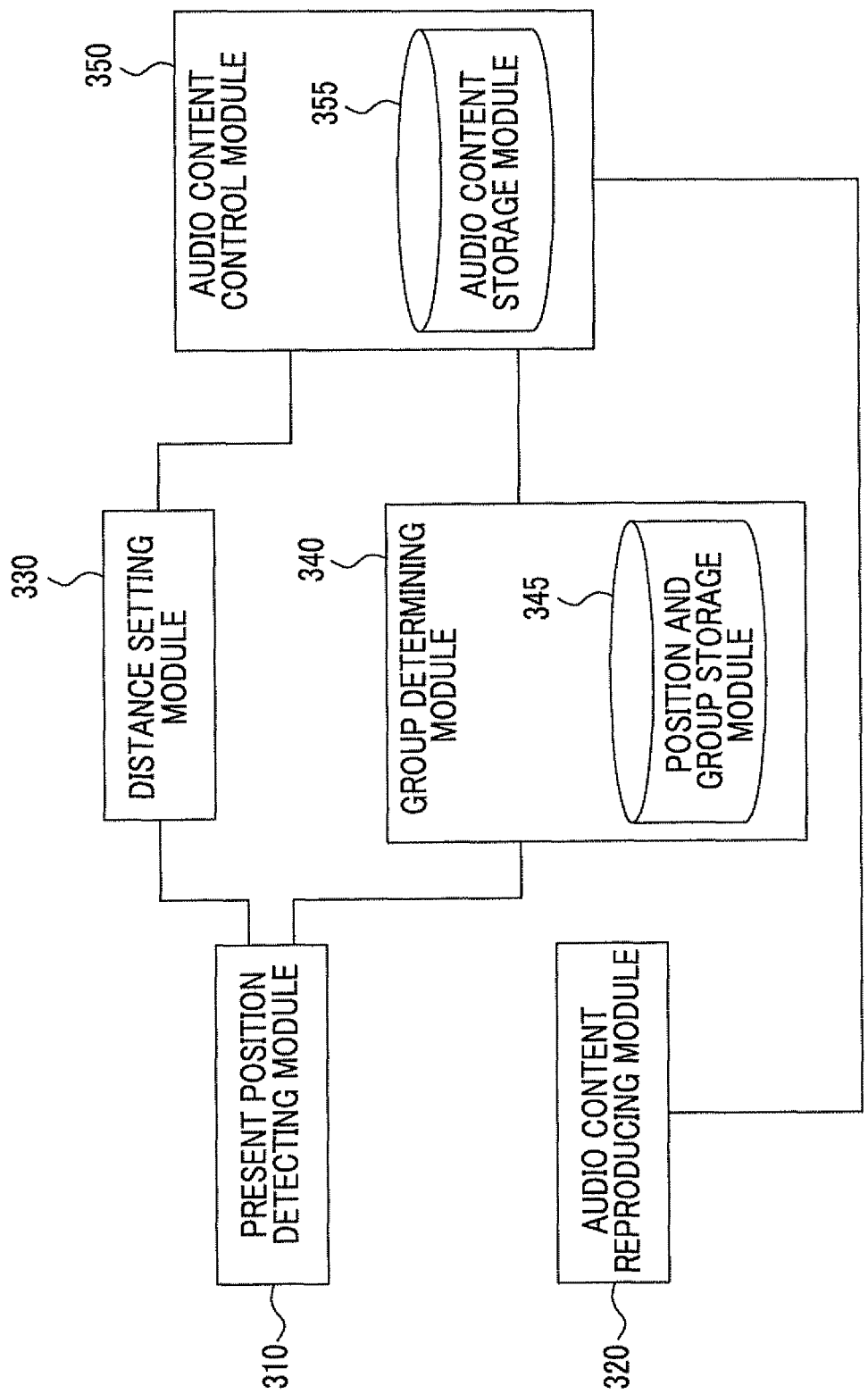
FIG. 3 is a conceptual module diagram illustrating an example of the configuration of a first exemplary embodiment of the invention.

FIG. 3 is a conceptual module diagram illustrating an example of the configuration of a first exemplary embodiment.

In general, a module represents software (computer program) which may be logically separated or hardware components. Accordingly, a module in this exemplary embodiment means a hardware module in addition to a module in a computer program. Therefore, this exemplary embodiment provides a computer program (such as a program causing a computer to perform respective sequences, a program causing a computer to function as respective units, and a program causing a computer to perform respective functions) which functions as such modules, a system, and a method. For the purpose of convenience of explanation, terms of "be stored" and "store" and terms equivalent thereto are used. Such terms mean to store something in a storage unit or to control something to be stored in a storage unit when the exemplary embodiment is a computer program. The modules may correspond to the functions in a one-to-one manner. From the viewpoint of mounting, one module may be constructed by one program, plural modules may be constructed by one program, or one module may be constructed by plural programs. Plural modules may be executed by one computer or one module may be executed by plural computers which are distributed or arranged in parallel. A module may include another module. Hereinafter, the term, "connection", is used for logical connection (reception of data, instruction, cross-reference between data, and the like) in addition to physical connection. The term, "predetermined", means that something is determined previous to a process to be performed and also means that some is determined depending on the circumstances at that time or depending on the circumstances or states up to now even after the flow of processes according to this exemplary embodiment is started but before a target process to is performed, in addition to before the flow of processes according to this exemplary embodiment is started. The description, "if A, B is performed", means that "it is determined whether A, and B is performed when A is determined". Here, a case where the determination on whether A is not necessary is excluded.

A system or an apparatus includes a configuration which is implemented by a single computer, hardware, apparatus, or the like in addition to a configuration in which plural computers, hardware, apparatuses are connected to each other via a communication connection such as a network (including a one-to-one communication connection). An "apparatus" and a "system" are used as a term having the same meaning. A "system" does not include an artificially-determined social "structure" (social system).

When plural processes are performed by each module or in each module, target information is read from a storage unit, the process is performed, and then the process result is written to the storage unit, for each process. Accordingly, the reading from a storage unit before the process or the writing to the storage unit after the process may not be described. Herein, the storage unit may include a hard disk, a RAM (Random Access Memory), an external storage medium, a storage unit via a communication line, and a register in a CPU (Central Processing Unit).

An information processing apparatus according to a first exemplary embodiment of the invention is an apparatus outputting an audio content with a sound and includes a present position detecting module 310, an audio content reproducing module 320, a distance setting module 330, a group determining module 340, and an audio content control module 350, as shown in FIG. 3.

The present position detecting module 310 is connected to the distance setting module 330 and the group determining module 340. The present position detecting module 310 detects the present position of the information terminal 100 or the like (that is, the position of an operator) and sends the detected position information to the distance setting module 330 and the group determining module 340. Specifically, the present position detecting module corresponds to a GPS.

The audio content reproducing module 320 is connected to an audio content control module 350. The audio content reproducing module 320 corresponds to the audio output unit 230 shown in FIG. 2 and reproduces an audio content stored in the audio content storage module 355 with a sound under the control of the audio content control module 350.

Figure 4:
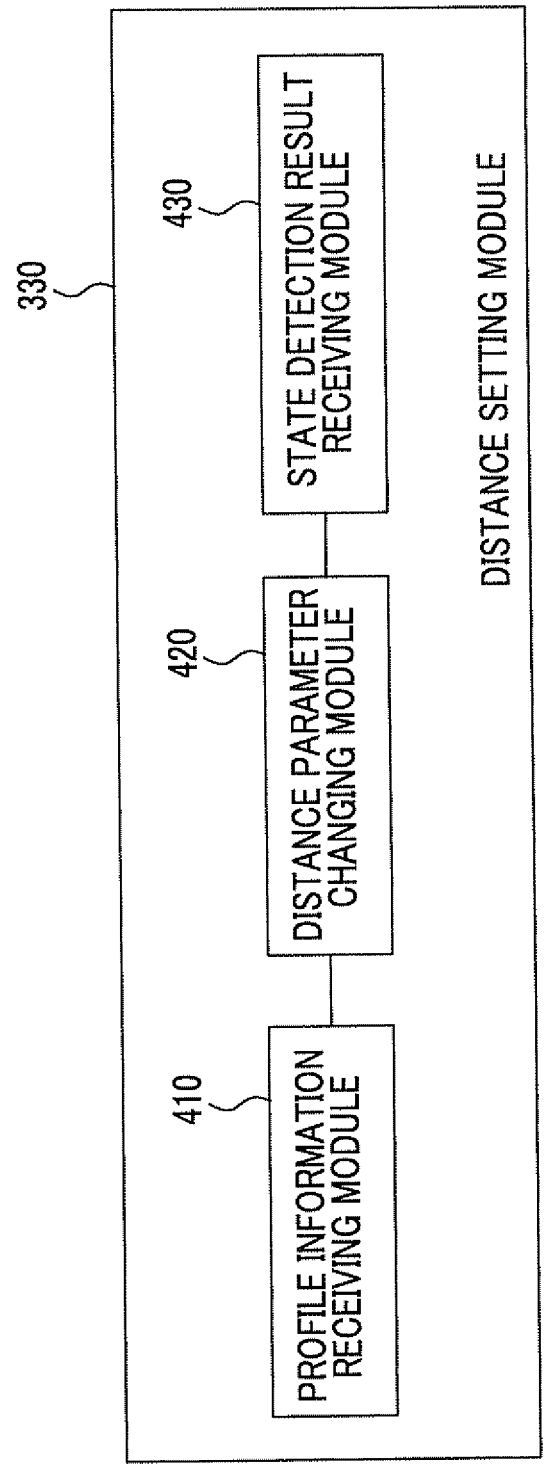
FIG. 4 is a conceptual module diagram illustrating an example of the configuration of a distance setting module.

The distance setting module 330 is connected to the present position detecting module 310 and the audio content control module 350. The distance setting module 330 sets a first distance or a second distance. For example, the first distance or the second distance may be a predetermined value. As shown in FIG. 4, the distance setting module 330 may change the first distance or the second distance which is a predetermined value on the basis of information on an operator or information on circumstances of the operator.

The first distance is a distance used to start an explanation of an object when the distance between the position of the object and the position of the information terminal 100 or the like is equal to or less than the first distance. The second distance is a distance used to stop the explanation when the distance between the position of the object and the position of the information terminal 100 or the like is first less than the first distance and becomes greater than the second distance after the explanation is started. Here, the second distance is greater than the first distance. Accordingly, when the distance between the position of the object and the position of the information terminal 100 or the like is equal to or less than the first distance, the explanation is started. However, when the distance between the position of the object and the position of the information terminal 100 or the like is greater than the first distance but is less than the second distance, the explanation is continuously provided. When the distance is less than the second distance and the return button 120 is pressed, an explanatory sound reproduced just before is reproduced again.

FIG. 4 is a conceptual module diagram illustrating an example of the configuration of the distance setting module 330. The distance setting module 330 includes a profile information receiving module 410, a distance parameter changing module 420, and a state detection result receiving module 430.

The profile information receiving module 410 is connected to the distance parameter changing module 420. The profile information receiving module 410 receives information on an operator.

The state detection result receiving module 430 is connected to the distance parameter changing module 420. The state detection result receiving module 430 receives information on the circumstances of an operator.

The profile information receiving module 410 and the state detection result receiving module 430 may receive predetermined information (information on an operator and information on the circumstances of the operator) or may set the information through the use of a setting unit of the information terminal 100 or the like before using the information terminal 100.

Examples of the information on an operator include gender, age (generation), eyesight, and handicapped.

Examples of the information on the circumstances in which the operator uses the information terminal 100 include weather, road state (asphalt, muddy, and the like), open time of tourist facilities, and congestion situation.

The distance parameter changing module 420 is connected to the profile information receiving module 410 and the state detection result receiving module 430. The distance parameter changing module 420 changes the first distance or the second distance on the basis of attributes received by the profile information receiving module 410 or the state detection result receiving module 430. For example, when a predetermined condition is satisfied, the distance parameter changing module 420 may perform a predetermined process on the first distance or the second distance. More specifically, when the eyesight is higher than or equal to a predetermined value, the first distance and the second distance is multiplied by a predetermined magnification (larger than 1). Alternatively, when the weather is clear and the road state around an object is asphalt, a predetermined value is added to the first distance and the second distance.

The group determining module 340 is connected to the present position detecting module 310 and the audio content control module 350. When a second explanation position which is a position different from a first explanation position and which is a position for an explanation is detected within the first distance from the position detected by the present position detecting module 310 after explanation information corresponding to the first explanation position is reproduced with a sound by the audio content control module 350, the group determining module 340 determines whether the first explanation position and the second explanation position belong to the same group. The determination on whether both explanation positions belong to the same group uses a position and group table 700 stored in a position and group storage module 345. The group determining module 340 includes the position and group storage module 345. Here, the explanation information is a kind of audio content and is data for giving an explanation of an object with a sound.

Figure 7:
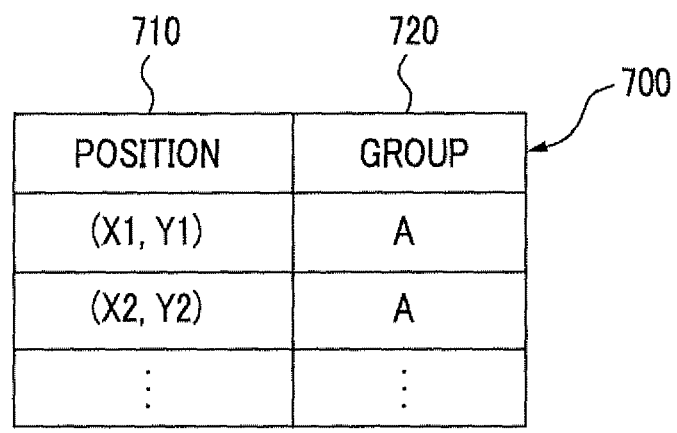
FIG. 7 is a diagram illustrating an example of the configuration of a position and group table.

The position and group storage module 345 stores, for example, the position and group table 700. FIG. 7 is a diagram illustrating an example of the configuration of the position and group table 700. The position and group table 700 includes a position column 710 and a group column 720. The position column 710 stores positions around objects (an explanation point 890 in FIG. 8 and explanation points 991, 992, and 993 in FIG. 9, which are described later). The group column 720 stores groups to which the positions belong. For example, when two positions belong to the same group, explanation information corresponding to the positions is shared. Specifically, when an explanation at position A in a group is started and then an operator moves to the vicinity of position B in the same group, an explanation at position B is not started but the explanation at position A is continued. When two positions belong to different groups, explanations are given using explanation information corresponding to the positions.

The audio content control module 350 is connected to the audio content reproducing module 320, the distance setting module 330, and the group determining module 340. When a first explanation position which is a position for an explanation is detected within the first distance which is a predetermined distance from the position detected by the present position detecting module 310, the audio content control module 350 controls the audio content reproducing module 320 to extract explanation information corresponding to the first explanation position from the audio content storage module 355 and to reproduce the extracted explanation information with a sound.

When the group determining module 340 determines that both positions belong to the same group, the audio content control module 350 controls the audio content reproducing module 320 to continue to reproduce the explanation information corresponding to the first explanation position with a sound.

When the group determining module 340 determines that both positions do not belong to the same group, the audio content control module 350 may control the audio content reproducing module 320 to reproduce the explanation information corresponding to the second explanation position.

The audio content control module 350 may control the audio content reproducing module 320 to stop reproducing the explanation information corresponding to the first explanation position or the second explanation position with a sound when the position detected by the present position detecting module 310 is separated greater than or equal to than the second distance which is a predetermined distance from the first explanation position or the second explanation position, and may control the audio content reproducing module 320 to continue to reproduce the explanation information corresponding to the first explanation position with a sound when the position detected by the present position detecting module 310 is separated greater than the first distance but less than the second distance from the first explanation position and is separated less than the first distance from the second explanation position and when the group determining module 340 determines that both belong to the same group.

The audio content control module 350 includes the audio content storage module 355.

The audio content storage module 355 stores explanation position information which is information on a position for an explanation and explanation information to correspond to each other.

The explanation information (hereinafter, also referred to as an audio content) stored in the audio content storage module 355 is information for reproducing a sound and examples thereof include audio information and text information to be converted into the audio information. More specifically, examples of the audio information include way data and MP3 data. The text information may be text information itself or may be information to which information (information on an accent or the like) to be converted into wav data or the like is added, for example, as a tab. The text information is reproduced with a sound through voice synthesis. The details of the audio content are, for example, an explanation of an object and specific examples thereof include an explanation on the fact that an object is located nearby, an explanation on where an object is located, and an explanation on an object. For example, the audio content storage module 355 stores an explanation information table 500 and a position and object table 600.

Figure 5:
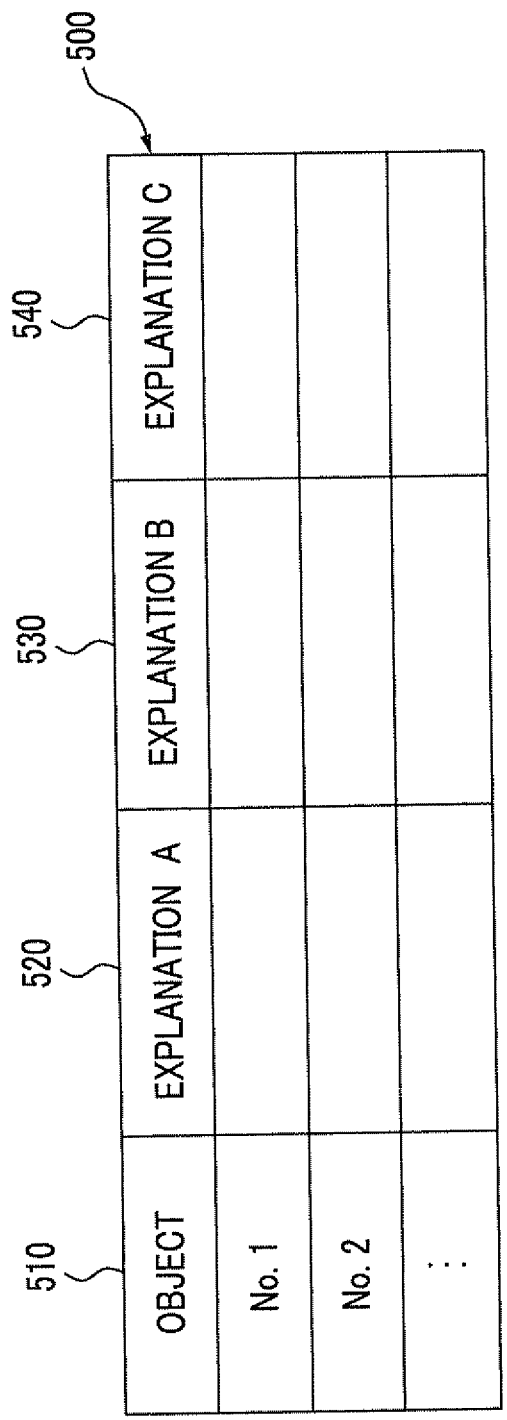
FIG. 5 is a diagram illustrating an example of the configuration of an explanation information table.

FIG. 5 is a diagram illustrating an example of the configuration of the explanation information table 500.

The explanation information table 500 stored in the audio content storage module 355 includes an object column 510, an explanation A column 520, an explanation B column 530, and an explanation C column 540. In this configuration, one object corresponds to three pieces of explanation information.

The object column 510 stores object identification codes.

The explanation A column 520 stores identification codes (file names or the like) of first explanation information corresponding to the objects.

The explanation B column 530 stores identification codes (file names or the like) of second explanation information corresponding to the objects.

The explanation C column 540 stores identification codes (file names or the like) of third explanation information corresponding to the objects.

The audio content control module 350 extracts the identification code of the explanation information corresponding to an object identification code from the explanation information table 500, extracts the explanation information from the audio content storage module 355, and controls the audio content reproducing module 320 to reproduce the explanation information with a sound.

Figure 6:
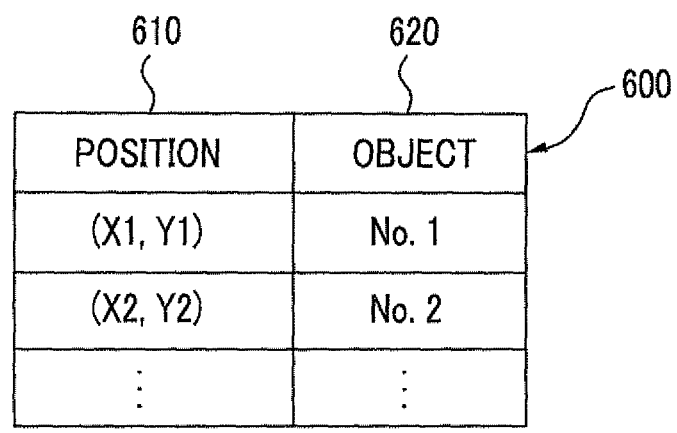
FIG. 6 is a diagram illustrating an example of the configuration of a position and object table.

FIG. 6 is a diagram illustrating an example of the configuration of the position and object table 600.

The position and object table 600 stored in the audio content storage module 355 includes a position column 610 and an object column 620.

The position column 610 stores position information of objects which is position information detected by the present position detecting module 310 and which includes latitudes and longitudes.

The object column 620 stores an object identification code of an object located at that position.

The audio content control module 350 extracts the object identification code of an object corresponding to the position information detected by the present position detecting module 310 form the position and object table 600. The correspondence between the position information of the position column 610 and the position information detected by the present position detecting module 310 will be described with reference to FIG. 8.

The explanation information table 500 and the position and object table 600 may be combined. That is, the object column 510 of the explanation information table 500 may be used as the position column 610 of the position and object table 600.

Figure 8:
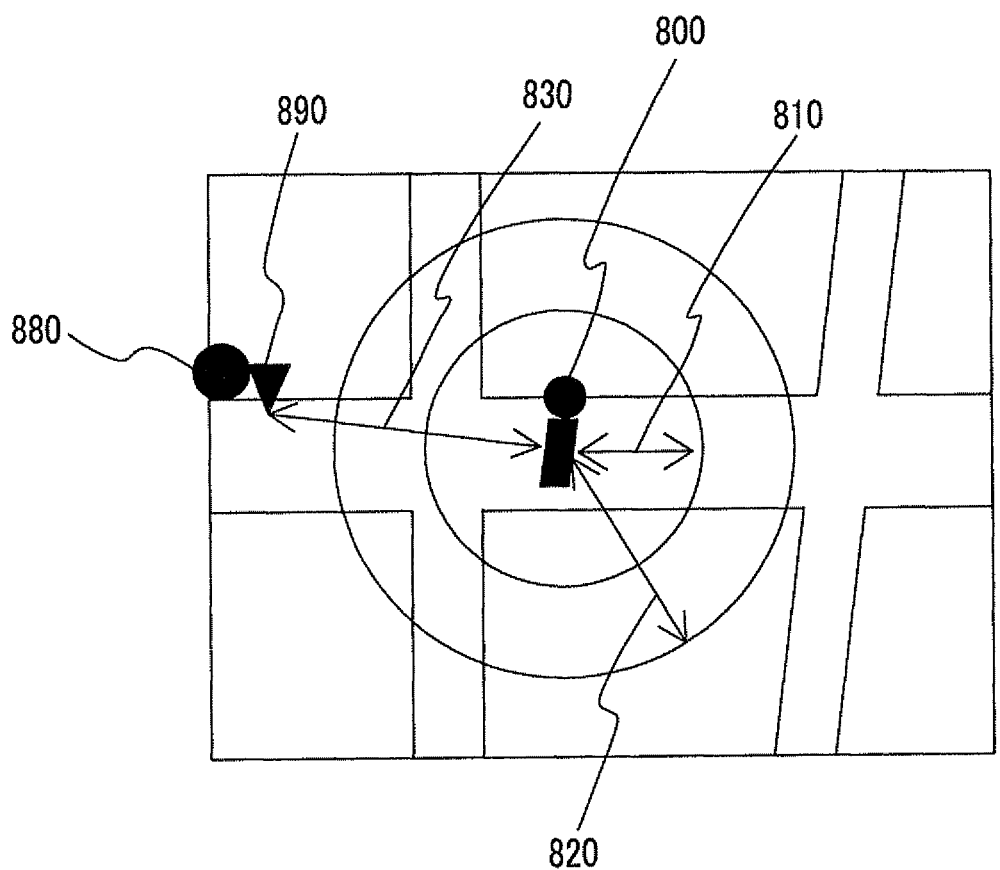
FIG. 8 is a diagram illustrating an example of the positional relationship between a user and an explanation object.

FIG. 8 is a diagram illustrating the positional relationship between a user 800 and an explanation point 890. The explanation point 890 is set to the vicinity of an explanation object 880. The present position detecting module 310 detects the position of the information terminal 100 or the like carried by the user 800. The position information of the explanation point 890 is stored in the position column 610 of the position and object table 600. The audio content control module 350 reproduces the explanation information corresponding to the explanation point 890 with a sound on the basis of the positional relationship between the user 800 and the explanation point 890.

For example, when the distance 830 from the user 800 to the explanation point 890 is less than a distance A 810, the audio content control module 350 determines that the distance is small and reproduces the explanation information corresponding to the object explanation point 890 with a sound for the user 800.

The distance used to determine that a user approaches an object (an explanation is started) and the distance used to determine that the user gets apart from the object (the explanation is stopped) may be set to be different from each other. This will be described with reference to FIG. 8. It is assumed that the distance A 810 (corresponding to the first distance) from the user 800 is smaller than a distance B 820 (corresponding to the second distance) from the user 800. When the user 800 approaches to an object, an object within the distance A 810 is determined to be close and explanation information corresponding to the object is reproduced. That is, the explanation corresponding to the explanation point 890 within the distance A 810 is reproduced with a sound. When the user gets apart from the object, that is, when the distance from the user becomes greater than the distance B 820, the reproduction of the explanation information is stopped because the user 800 gets apart from the object after the explanation information of the object is reproduced. That is, when an object is located within the distance B 820, it is determined that the object is close and the reproduction of the explanation information corresponding to the object is not stopped. In this way, the distances used to determine approach or separation (start and stop of an explanation) are set to be different from each other so as to cope with unevenness appearing in the position information detected by the present position detecting module 310. That is, it is intended to suppress the switching to the reproduction and the stop of the explanation information due to movement of a slight distance.

Figure 9:
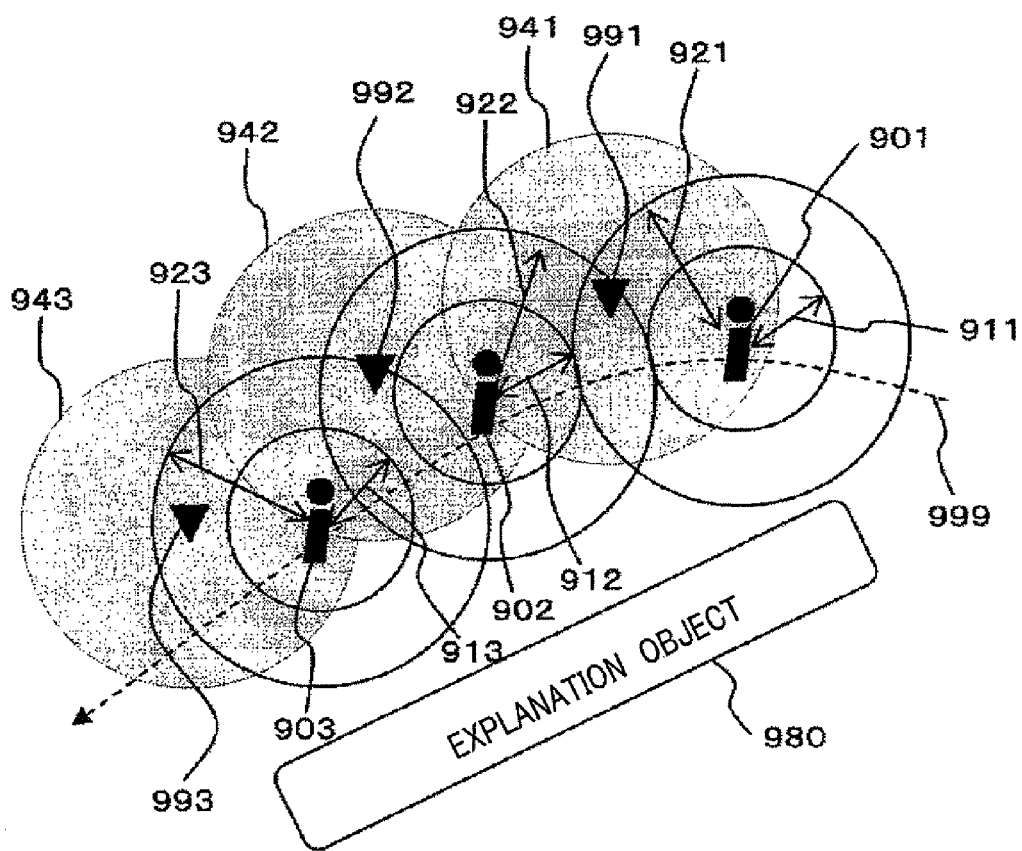
FIG. 9 is a diagram illustrating an example of the positional relationship between a user and an explanation object.

FIG. 9 is a diagram illustrating the positional relationship between a user and an explanation object.

Since an explanation object 980 is greater than a distance A 910 or a distance B 920 (double the distance A 910 or double the distance B 920), plural explanation points 990 (an explanation point 991, an explanation point 992, and an explanation point 993) are provided. When the user 900 moves from the position of the user 901 along a movement line 999, the explanation point 991 becomes located within a distance A 911. Then, as described above, an explanation corresponding to the explanation point 991 is started.

When the user 900 moves to the position of the user 902, the explanation point 991 is located within a distance B 922 and thus the explanation corresponding to the explanation point 991 is continued. When the user 900 moves from the position of the user 902 along the movement line 999, the explanation point 992 becomes located with the distance A 912. Then, the groups of the explanation point 991 and the explanation point 992 are extracted and it is determined whether both groups are the same. In this case, it is determined that both groups are the same group. Accordingly, even when the explanation point 992 becomes located within the distance A 911, the explanation corresponding to the explanation point 991 is continued without restarting the explanation corresponding to the explanation point 992.

Similarly, when the user 900 moves to the position of the user 903, the explanation point 992 is located within the distance B 923 and thus the explanation corresponding to the explanation point 991 is continued. When the user 900 moves from the position of the user 903 along the movement line 999, the explanation point 993 becomes located within the distance A 913. Then, the groups of the explanation point 992 and the explanation point 993 are extracted and it is determined whether both groups are the same group. In this case, it is determined that both groups are the same group. Accordingly, even when the explanation point 993 becomes located within the distance A 913, the explanation corresponding to the explanation point 991 is continued without restarting the explanation corresponding to the explanation point 993.

Figure 10:
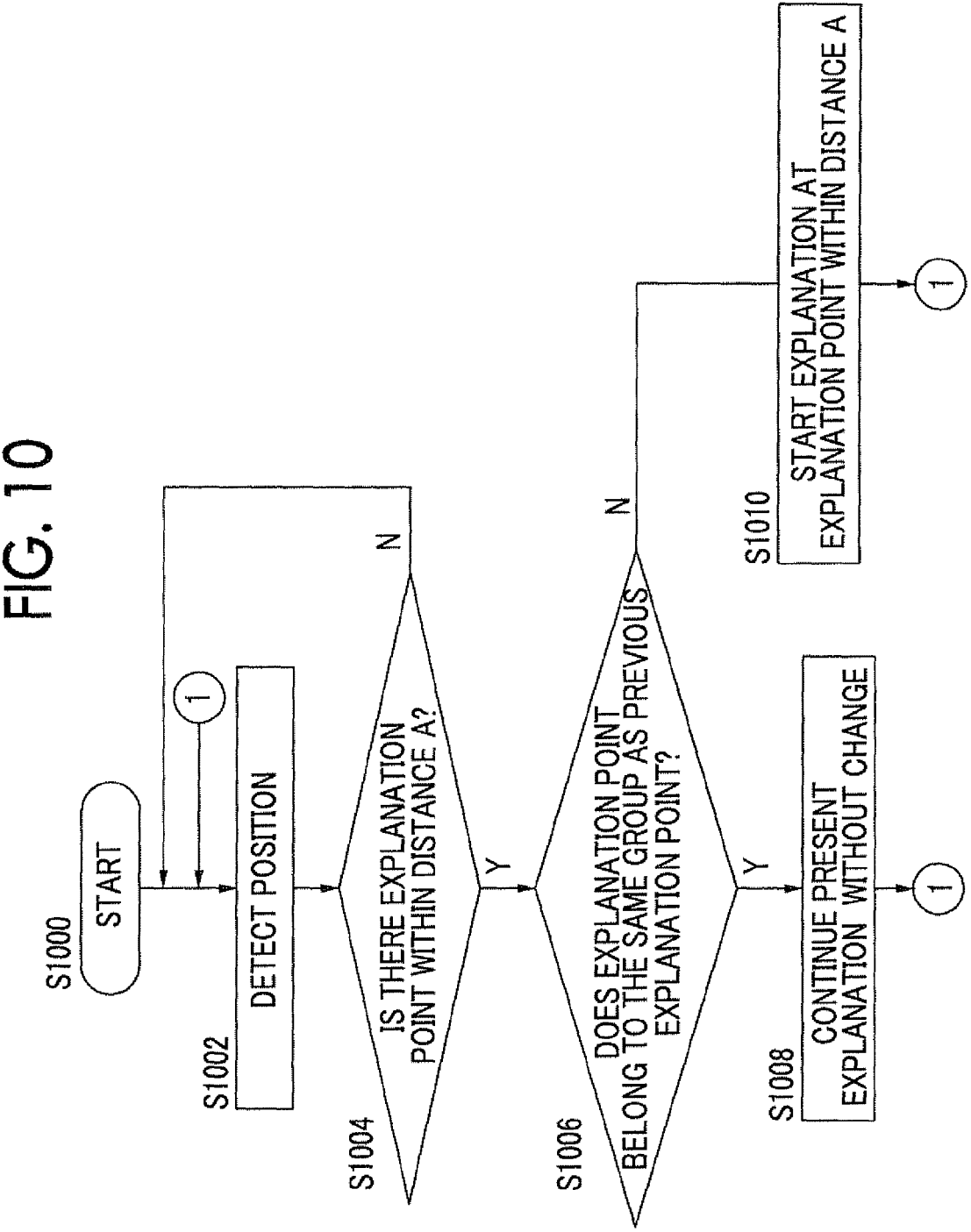
FIG. 10 is a flowchart illustrating the flow of processes in the first exemplary embodiment.

FIG. 10 is a flowchart illustrating an example of the flow of processes in the first exemplary embodiment.

In step S1002, the present position detecting module 310 detects a position.

In step S1004, the audio content control module 350 determines whether an explanation point is located within the distance A, performs the process of step S1006 when it is determined that the explanation point is located within the distance A, and performs again the process of step S1002 otherwise.

In step S1006, the group determining module 340 determines whether the explanation point and the previous explanation point belong to the same group, performs the process of step S1008 when it is determined that both explanation points belong to the same group, and performs the process of step S1010 otherwise.

In step S1008, the audio content control module 350 continues to give the present explanation.

In step S1010, the audio content control module 350 starts an explanation corresponding to the explanation point within the distance A.

At the first time (when the operator of the information terminal 100 is changed after the information terminal 100 is reset or the like), the determination result in step S1006 is N and the process of step S1010 is performed. For example, it may be determined whether this is the first time, the flow of processes goes to the process of step S1010 or the initial value of the group of the previous explanation point may be set to an imaginary (not set) group.

In the processes of step S1006 or the subsequent steps thereof, it may be determined whether the present position is separated greater than or equal to the second distance from the previous explanation point or the present explanation point, and the reproduction of the explanation information corresponding to the previous explanation point or the present explanation point with a sound may be stopped when it is determined that the present position is separated greater than or equal to the second distance therefrom. When the present position is separated greater than the first distance but less than the second distance from the previous explanation point, the present position is within the first distance from the present explanation point, and it is determined that the previous explanation point and the present explanation point belong to the same group, the explanation information corresponding to the previous explanation point may be continuously reproduced with a sound.

When the present position is within the first distance from the previous explanation point, the present position is within the first distance from the present explanation point, and it is determined that the previous explanation point and the present explanation point belong to the same group, the explanation information corresponding to the previous explanation point may be continuously reproduced with a sound.

It may be determined whether the present position becomes separated greater than or equal to the second distance from the previous explanation point and the present explanation point, and the reproduction of the explanation information corresponding to the previous explanation point and the present explanation point with a sound may be stopped when it is determined that the present position becomes separated therefrom.

Figure 11:
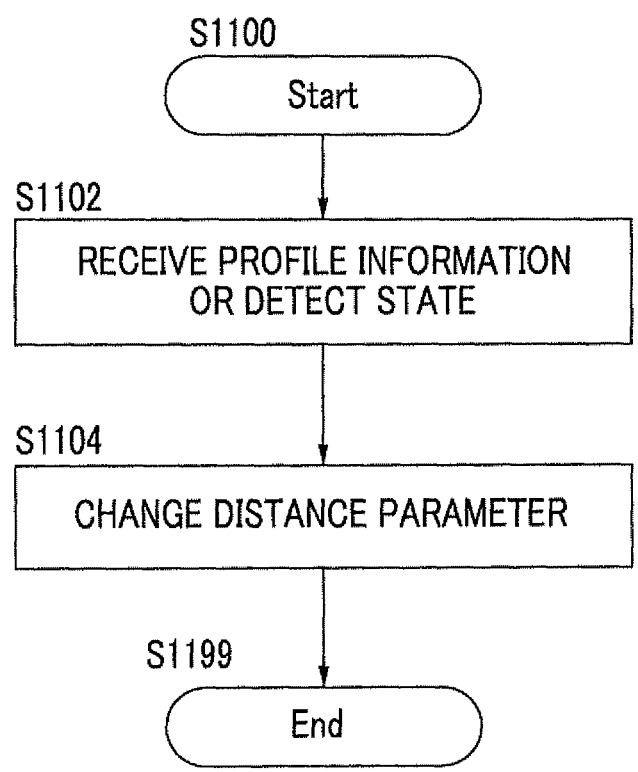
FIG. 11 is a flowchart illustrating the flow of processes in a distance setting module.

FIG. 11 is a flowchart illustrating an example of the flow of processes in the distance setting module 330.

In step S1102, the profile information receiving module 410 receives profile information. Alternatively, the state detection result receiving module 430 detects a state.

In step S1104, the distance parameter changing module 420 changes a distance parameter.

Figure 12:
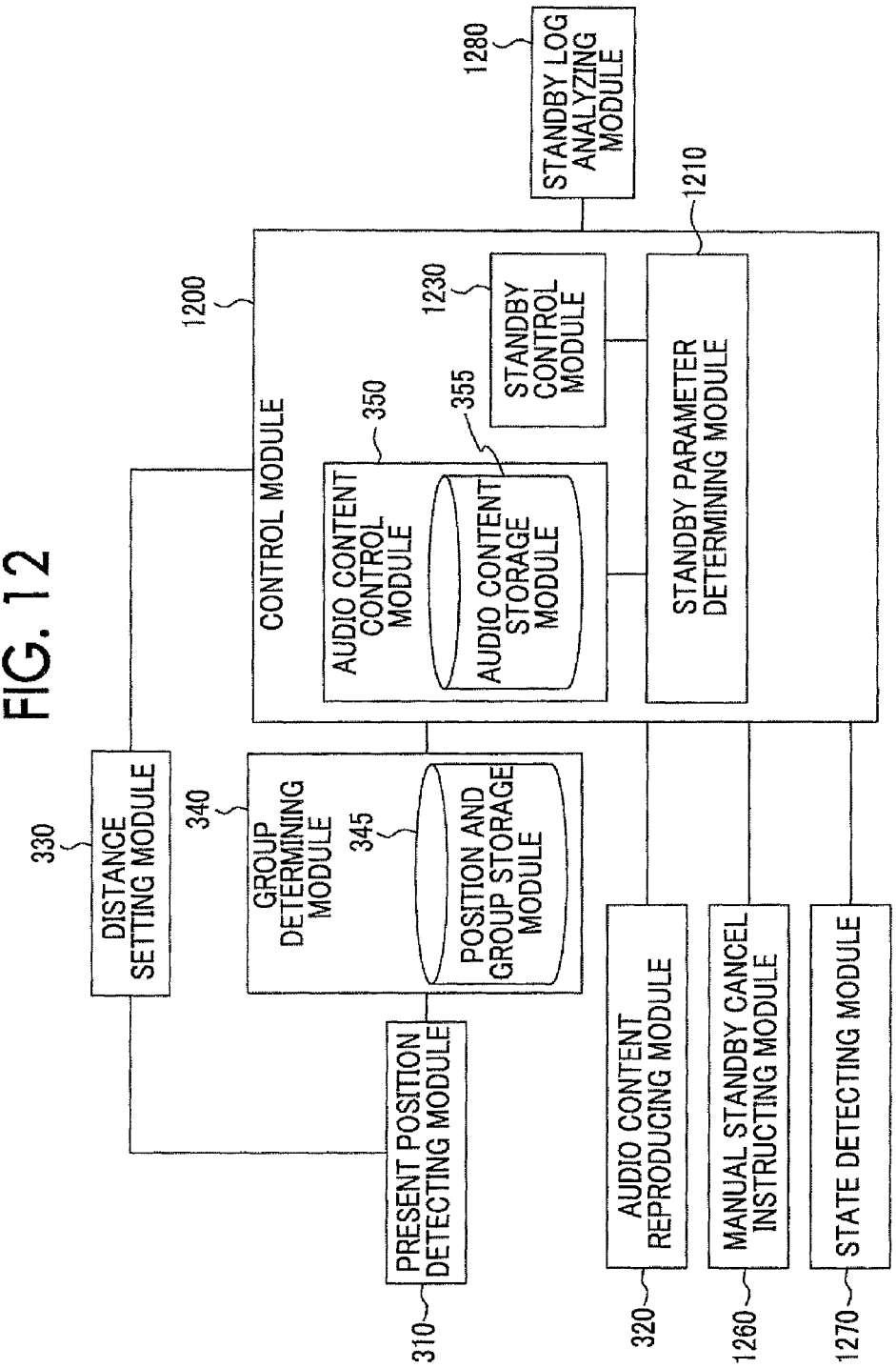
FIG. 12 is a conceptual module diagram illustrating an example of the configuration of a second exemplary embodiment of the invention.

FIG. 12 is a conceptual module diagram illustrating an example of the configuration of a second exemplary embodiment of the invention.

As shown in FIG. 12, an information processing apparatus according to the second exemplary embodiment is an apparatus outputting an audio content with a sound and includes a present position detecting module 310, an audio content reproducing module 320, a distance setting module 330, a group determining module 340, a control module 1200, a manual standby cancel instructing module 1260, a state detecting module 1270, and a standby log analyzing module 1280.

The same elements as in the first exemplary embodiment are referenced by the same reference numerals and perform the same processes as in the first exemplary embodiment. Accordingly, they will not be repeatedly described. Here, the processes in the second exemplary embodiment will be described.

The control module 1200 includes an audio content control module 350, a standby parameter determining module 1210, and standby control module 1230. The control module 1200 controls the output of an audio content such as explanation information. When plural pieces of explanation information are output for one object (for example, when plural explanations are provided for one sightseeing object), the control module 1200 controls the time (standby time) until subsequent explanation information is output after certain explanation information is fully output. The control module 1200 may control the time of outputting the respective pieces of explanation information instead of the standby time and thus may control the respective standby times as a result.

The standby parameter determining module 1210 is connected to the audio content control module 350 and the standby control module 1230. The standby parameter determining module 1210 determines a standby parameter (a variable) for setting the standby time and sends the determined standby parameter to the audio content control module 350 and the standby control module 1230. The module configuration of the standby parameter determining module 1210 will be described later with reference to FIG. 13. Examples of the standby parameter include a standby time, a sound reproduced during the standby (a sound indicating the standby, such as music as a BGM), and the volume of the sound.

The audio content control module 350 is connected to the standby parameter determining module 1210 and includes an audio content storage module 355. The audio content reproducing module 320 outputs an audio content stored in the audio content storage module 355 on the basis of the standby parameter determined by the standby parameter determining module 1210. Regarding the determination of the audio content to be output, the audio content control module 350 calculates the distance between the position information detected by the present position detecting module 310 and the position information of an object and controls the audio content reproducing module 320 to reproduce an audio content corresponding to the object when determining that the calculated distance is less than a predetermined distance (the first distance).

The standby control module 1230 is connected to the standby parameter determining module 1210. The standby control module 1230 controls the standby time on the basis of the standby parameter determined by the standby parameter determining module 1210. In this case, the time of causing the audio content control module 350 to reproduce the explanation information with a sound is controlled. The standby parameter includes a standby parameter extracted by a standby parameter extracting module 1320 (see FIG. 13) of the standby parameter determining module 1210 or a standby parameter corrected by a standby parameter correcting module 1350 (see FIG. 13). When the manual standby cancel instructing module 1260 detects the cancel of a standby based on an operator's operation, the standby is cancelled and subsequent explanation information is output. A log (for example, information in which an explanation information ID to be output in the next time, a start time of a standby, and an end time of the standby (the time when the play & pause button 110 is pressed) are correlated) is sent to the standby log analyzing module 1280.

The standby control module 1230 may cancel the standby to start a subsequent explanation, when a predetermined action is detected by the state detecting module 1270 in a period of time from a predetermined time point to a subsequent explanation during a standby. Here, the "period of time from a predetermined time to a subsequent explanation" means a period of time from a certain time point to the start of a subsequent explanation. For example, it corresponds to a second half period of the standby. Here, it does not means necessarily that it is next to a half of the standby period, but it has only to be a period of time having a predetermined time point as a start point and a subsequent explanation to be predicted as an end point. The "predetermined time point" may be determined depending on the time from the previous explanation, the time to a subsequent explanation, and the ratio in the standby period. The "predetermined action" is an action indicating that an operator is located in the vicinity of an object, that is, an action allowing the start of an explanation of the object. For example, when the object is located above, the predetermined action is an action that the operator's face is directed to the upside. In addition to the action that the face is directed to the upside, the predetermined action may be an action that the face is directed to the upside for a predetermined time or more.

In the standby cancelling process, the standby control module 1230 may not cancel the standby when the position detected by the present position detecting module 310 is a predetermined position. That is, when the operator does not reach the vicinity of an object yet but such an action is detected, an explanation should not be started. Accordingly, when it is determined that the information terminal 100 or the like (the operator) is located at a "predetermined position" (for example, a position separated greater than or equal to x m form the object) on the basis of the position information detected by the present position detecting module 310, the standby is not cancelled. That is, the explanation is not started.

The standby control module 1230 may control the audio content control module 350 to cause the audio content reproducing module 320 to reproduce a sound indicating the standby during the standby on the basis of the standby parameter. For example, a BGM or the like is reproduced even in the standby.

The control module 1200 is connected to the audio content reproducing module 320, the distance setting module 330, the group determining module 340, the manual standby cancel instructing module 1260, the state detecting module 1270, and the standby log analyzing module 1280.

The present position detecting module 310 is connected to the distance setting module 330 and the group determining module 340. The present position detecting module 310 detects the present position of the information terminal 100 (that is, the position of an operator) and sends the detected position information to the standby parameter determining module 1210 of the control module 1200.

The audio content reproducing module 320 is connected to the control module 1200.

The distance setting module 330 is connected to the present position detecting module 310 and the control module 1200.

The group determining module 340 is connected to the present position detecting module 310 and the control module 1200.

The manual standby cancel instructing module 1260 is connected to the control module 1200. The manual standby cancel instructing module 1260 detects that the play & pause button 110 shown in FIG. 1 is pressed. That is, the manual standby cancel instructing module 1260 detects that the play & pause button 110 is pressed in a standby state and sends the detection result to the standby control module 1230 of the control module 1200.

The state detecting module 1270 is connected to the control module 1200. The state detecting module 1270 is a sensor detecting an operator's state and sends the detected state information to the standby parameter determining module 1210 of the control module 1200. Examples thereof include a microphone, an acceleration sensor, a terrestrial magnetic sensor, and a sensor counting the number of steps. The sensor unit 220 may be included in the main body of the information terminal 100 or may be included in the earphone 160.

When the state detecting module 1270 is included in the earphone 160, the sensor unit detects an operator's face state (for example, a posture directed to upside or downside or a nodding posture).

For example, the state detecting module 1270 may detect whether a conversation is carried out through the use of a microphone.

The state detecting module 1270 may detect the number of persons participating in the conversation by the use of a microphone and a voice recognizing module. The state detecting module 1270 may detect the number of information terminals 100 in the periphery through the use of a Bluetooth communication function. That is, the number of apparatuses which may communicate through the Bluetooth is detected. This means that the number of persons is detected when each person carries one information terminal 100.

For example, the state detecting module 1270 may detect whether an operator moves by the use of an acceleration sensor. The state detecting module 1270 may detect the direction in which the operator moves by the use of a terrestrial magnetic sensor. The state detecting module 1270 may detect the number of steps of the operator by the use of a step number sensor. The state detecting module 1270 may detect the time in which the operator stops walking by the use of an acceleration sensor and a step number sensor. The state detecting module 1270 may detect the more detailed position information of the operator than the GPS by combination with the position information detected by the present position detecting module 310.

The standby log analyzing module 1280 is connected to the control module 1200. The standby log analyzing module 1280 receives a standby log from the standby control module 1230 of the control module 1200 and analyzes the received log to generate a standby parameter.

Figure 13:
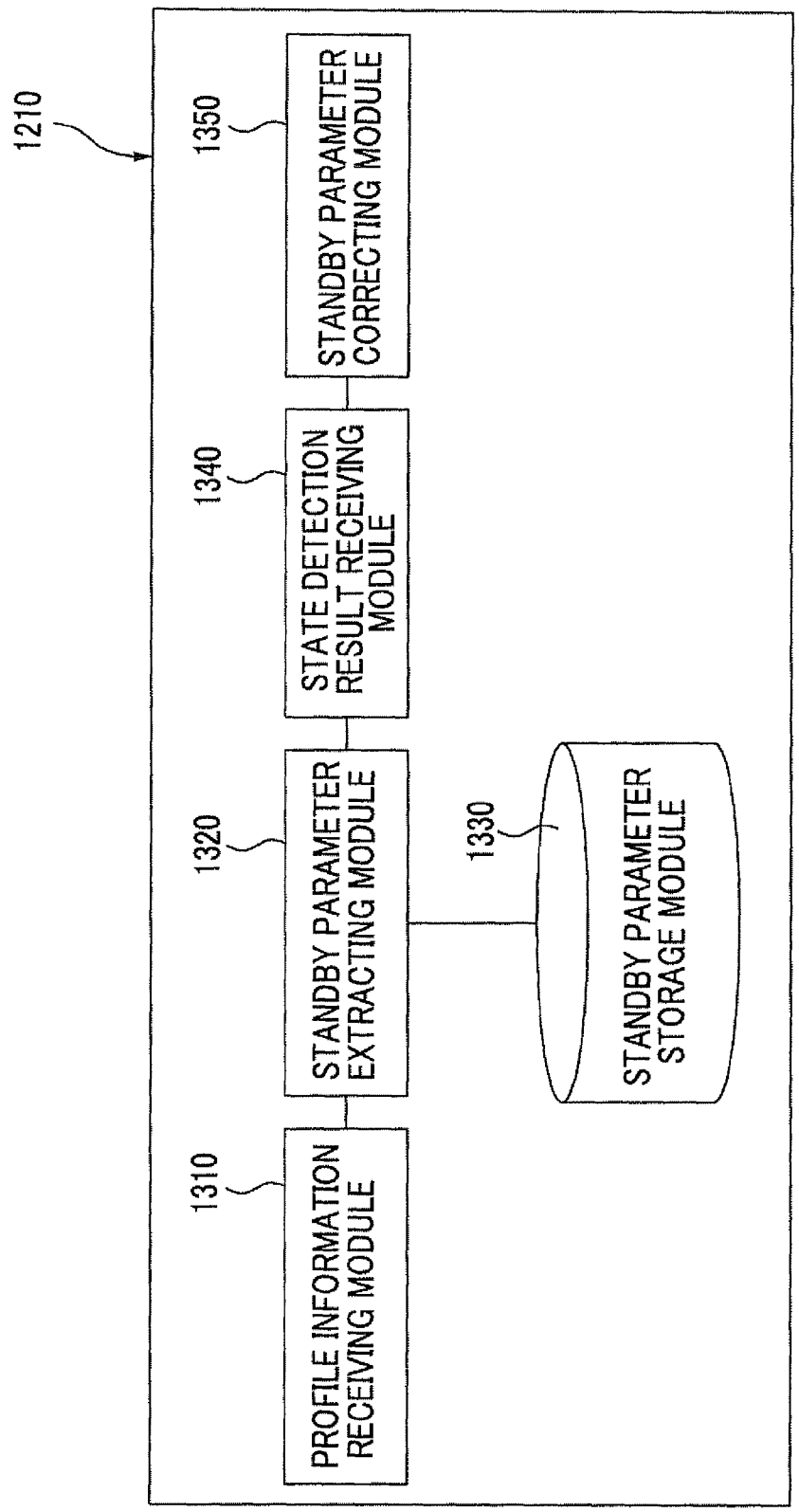
FIG. 13 is a conceptual module diagram illustrating an example of the configuration of a standby parameter determining module.

FIG. 13 is a conceptual module diagram illustrating an example of the configuration of the standby parameter determining module 1210.

The standby parameter determining module 1210 includes a profile information receiving module 1310, a standby parameter extracting module 1320, a standby parameter storage module 1330, a state detection result receiving module 1340, and a standby parameter correcting module 1350.

The profile information receiving module 1310 is connected to the standby parameter extracting module 1320 and receives an attribute (hereinafter, also referred to as a profile) of an operator or the circumstances in which the operator uses the information terminal 100 or the like. For example, the profile information receiving module 1310 may receive a predetermined profile or may set a profile by the use of a setting unit of the information terminal 100 before using the information terminal 100.

Examples of the attribute on an operator include gender, age (generation), eyesight, and handicapped.

Examples of the attribute on the circumstances in which the operator uses the information terminal 100 include weather, road state (asphalt, muddy, and the like), open time of tourist facilities, and congestion situation.

The standby parameter extracting module 1320 is connected to the profile information receiving module 1310, the standby parameter storage module 1330, and the state detection result receiving module 1340 and extracts a standby parameter for giving an explanation to the operator from the standby parameter storage module 1330 on the basis of the attribute of the operator or the like received by the profile information receiving module 1310. The standby parameter extracting module 1320 sends the extracted standby parameter to the standby control module 1230 or the standby parameter correcting module 1350.

The standby parameter storage module 1330 is connected to the standby parameter extracting module 1320 and stores attributes of the operator or the like and standby parameters which are information on the standby between an explanation (output of explanation information) and a subsequent explanation to correspond to each other.

The state detection result receiving module 1340 is connected to the standby parameter extracting module 1320 and the standby parameter correcting module 1350 and receives the operator's state detected by the state detecting module 1270.

The standby parameter correcting module 1350 is connected to the state detection result receiving module 1340 and corrects the standby parameter extracted by the standby parameter extracting module 1320 on the basis of the operator's state received by the state detection result receiving module 1340. For example, when a conversation is detected by the state detecting module 1270, the standby parameter correcting module 1350 corrects the standby time to be longer or corrects the standby time depending on the number of persons participating in the conversation detected by the state detecting module 1270. For example, the standby parameter correcting module 1350 corrects the standby time to be longer depending on the time in which the operator stops the walking, which is detected by the state detecting module 1270. The standby parameter storage module 1330 may be a storage device externally connected to the information terminal 100 via a communication line. In this case, the standby parameter extracting module 1320 may extract the standby information from the standby parameter storage module 1330 externally connected on the basis of the attribute received by the profile information receiving module 1310.

An example where plural explanations are provided for one object is described above, but a more specific example where three explanations are provided for one object will be described below.

The audio content storage module 355 stores first explanation information, second explanation information, and third explanation information of an object. Here, the first explanation information is information on an explanation to be given in advance before explaining the object and specific examples thereof include an explanation that the object is located nearby, and a signal notifying a start of an explanation. The signal notifying a start of an explanation is, for example, a voice "phone", and may produce such a sound effect to cause the operator to recognize the start of an explanation. The second explanation information is information on an explanation to be given after the first explanation information is reproduced and an explanation for allowing the operator to search for the object and specific examples thereof include an explanation on where the object is located. The third explanation information is information on an explanation to be given after the second explanation information is reproduced and an explanation of the object and a specific example thereof is an explanation of the object itself.

Since three explanations are provided, two standbys are present.

The standby parameter storage module 1330 stores a first standby parameter which is information on a first standby and a second standby parameter which is information on a second standby. Here, the "first standby" is a period of time from an end of reproduction of the first explanation information to a start of reproduction of the second explanation information and the "second standby" is a period of time from an end of reproduction of the second explanation information to a start of reproduction of the third explanation information.

The standby parameter extracting module 1320 extracts the first standby parameter and the second standby parameter from the standby parameter storage module 1330 on the basis of the attribute (one or both of an attribute of the operator and the attribute on the circumstances in which the operator uses the information terminal 100 or the like) received by the profile information receiving module 1310.

The state detecting module 1270 detects a first state of the operator in the first standby and detects a second state of the operator in the second standby. Examples of the states include the number of persons following the operator, the direction in which the operator moves, and the direction of the operator's face.

The standby parameter correcting module 1350 corrects the first standby parameter on the basis of the first state and corrects the second standby parameter on the basis of the second state.

The standby control module 1230 controls the period of time between the first explanation and the second explanation from the audio content reproducing module 320 on the basis of the first standby parameter corrected by the standby parameter correcting module 1350 and controls the period of time between the second explanation and the third explanation from the audio content reproducing module 320 on the basis of the second standby parameter corrected by the standby parameter correcting module 1350.

FIG. 14 is a diagram illustrating an example of the configuration of a standby parameter table 1400.

The standby parameter table 1400 stored in the standby parameter storage module 1330 includes an attribute column 1410, a standby time A column 1420, a standby A (BGM) column 1430, a standby time B column 1440, and a standby B (BGM) column 1450. In this example, three pieces of explanation information are provided for one object (two standbys are present).

The attribute column 1410 stores an attribute of an operator or an attribute on the circumstances in which the operator uses the information terminal 100 or the like. Examples of the attribute of an operator include gender, age (generation), eyesight, and handicapped. Examples of the attribute on the circumstances in which the operator uses the information terminal 100 or the like include weather, road state (asphalt, muddy, or and the like), open time of tourist facilities, and congestion situation. The number of standby time A columns 1420 may be two or more. This is to cope with plural attributes. When plural attributes are present, the number of standby parameters corresponds to the combination thereof. That is, the number of rows of the standby parameter table 1400 increases.

The standby time A column 1420 stores the first standby time for the corresponding object and the corresponding attribute.

The standby A (BGM) column 1430 stores an identifier of an audio content (for example, the BGM) to be reproduced by the audio content reproducing module 320 during the first standby.

The standby time B column 1440 stores the second standby time for the corresponding object and the corresponding attribute.

The standby B (BGM) column 1450 stores an identifier of an audio content (for example, the BGM) to be reproduced by the audio content reproducing module 320 during the second standby.

The standby parameter extracting module 1320 extracts the standby parameter (the standby time A column 1420, the standby A (BGM) column 1430, the standby time B column 1440, and the standby B (BGM) column 1450) corresponding to the attribute received from the standby parameter table 1400 by the profile information receiving module 1310.

FIG. 15 is a flowchart illustrating an example of the flow of processes in the second exemplary embodiment.

In step S1502, the profile information receiving module 1310 receives profile information.

In step S1504, the standby parameter extracting module 1320 extracts a standby parameter and determines the standby parameter.

The processes from step S1506 to step S1520 are processes on voice guidance. That is, a process of reproducing explanation information with a sound and a process of controlling the standby are performed.

In step S1508, the present position detecting module 310 acquires the present position information.

In step S1510, the audio content control module 350 performs a process of determining an approach to an explanation point. For example, the determination described with reference to FIG. 8 is performed. That is, when the distance 830 from the user 800 to the explanation point 890 is less than the distance A 810, it is determined that the object is located nearby. Otherwise, it is determined that the object is located distant.

In step S1512, the audio content control module 350 performs again the process of step S1508 when it is determined in step S1510 that the object is located distant, and performs the process of step S1514 when it is determined that the object is located nearby.

In step S1514, the audio content control module 350 performs a process of reproducing audio information 1 (reproducing the first explanation information).

In step S1516, the standby control module 1230 performs a standby control process. This process will be described later with reference to FIG. 22.

In step S1518, the audio content control module 350 performs a process of reproducing audio information 2 (reproducing of the second explanation information).

In step S1522, the standby log analyzing module 1280 collects the standby logs. For example, when the standby is cancelled by the manual standby cancel instructing module 1260, the standby log analyzing module 1280 detects the standby time and stores the detected standby time as the log of the attribute.

In step S1524, the audio content control module 350 performs a process of generating a standby parameter. For example, the audio content control module 350 newly generates a standby parameter of the attribute on the basis of the log stored in step S1522. Then, the flow of processes goes back to step S1504.

In the flowchart shown in FIG. 15, only one standby is present. When two standbys are present, steps 1516 and step S1518 (process of reproducing audio information 3) may be added after step S1518.

When three or more standbys are present, plural sets of step S1516 and step S1518 (process of reproducing audio information N, where N≥3) may be added.

The process of step S1524 performed by the audio content control module 350 will be described with reference to FIGS. 16 to 21.

Figure 16:
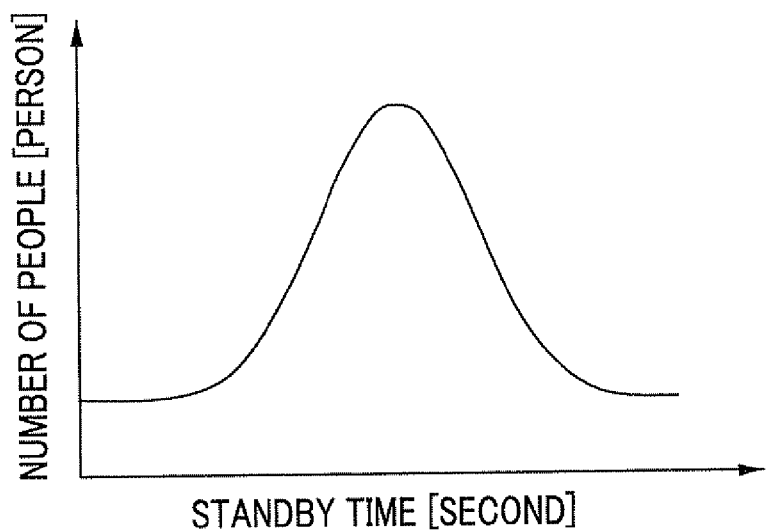
FIG. 16 is a graph illustrating an example of the relationship between a standby time and the number of persons.
Figure 17:
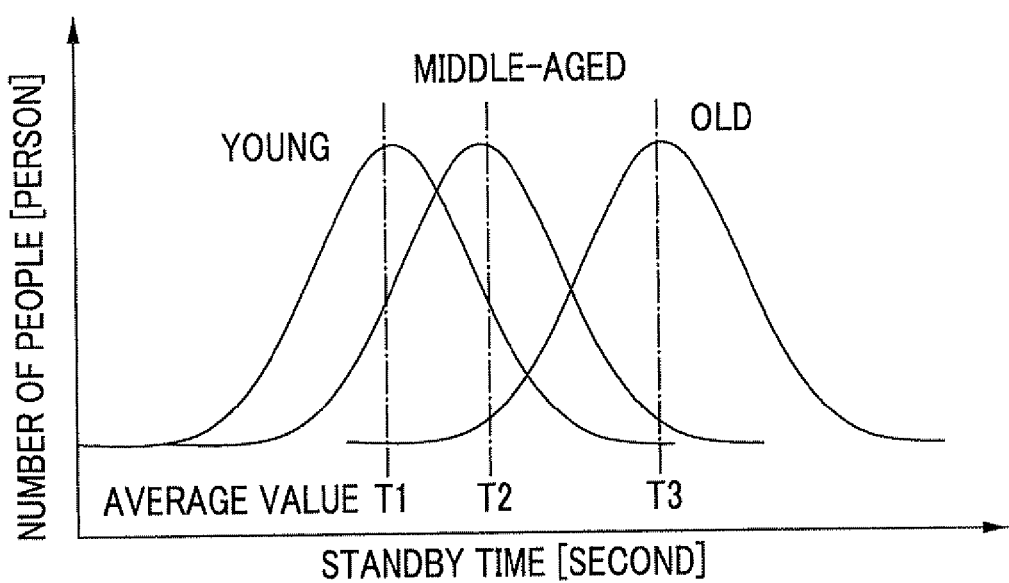
FIG. 17 is a graph illustrating an example of the relationship between the standby time and the number of persons.

FIGS. 16 and 17 are graphs illustrating the relationship between the standby time and the number of persons. This is a basic standby distribution graph in which the number of persons having a standby time is plotted with a horizontal axis representing the standby time and a vertical axis representing the number of persons. This graph is prepared by sampling the standby cancelling time for each object due to manual cancel (when the play & pause button 110 is pressed as a play button) of N persons and calculating the result as a basic standby distribution. In the example shown in FIG. 17, the basic distribution is prepared for each attribute such as a generation.

Figure 18:
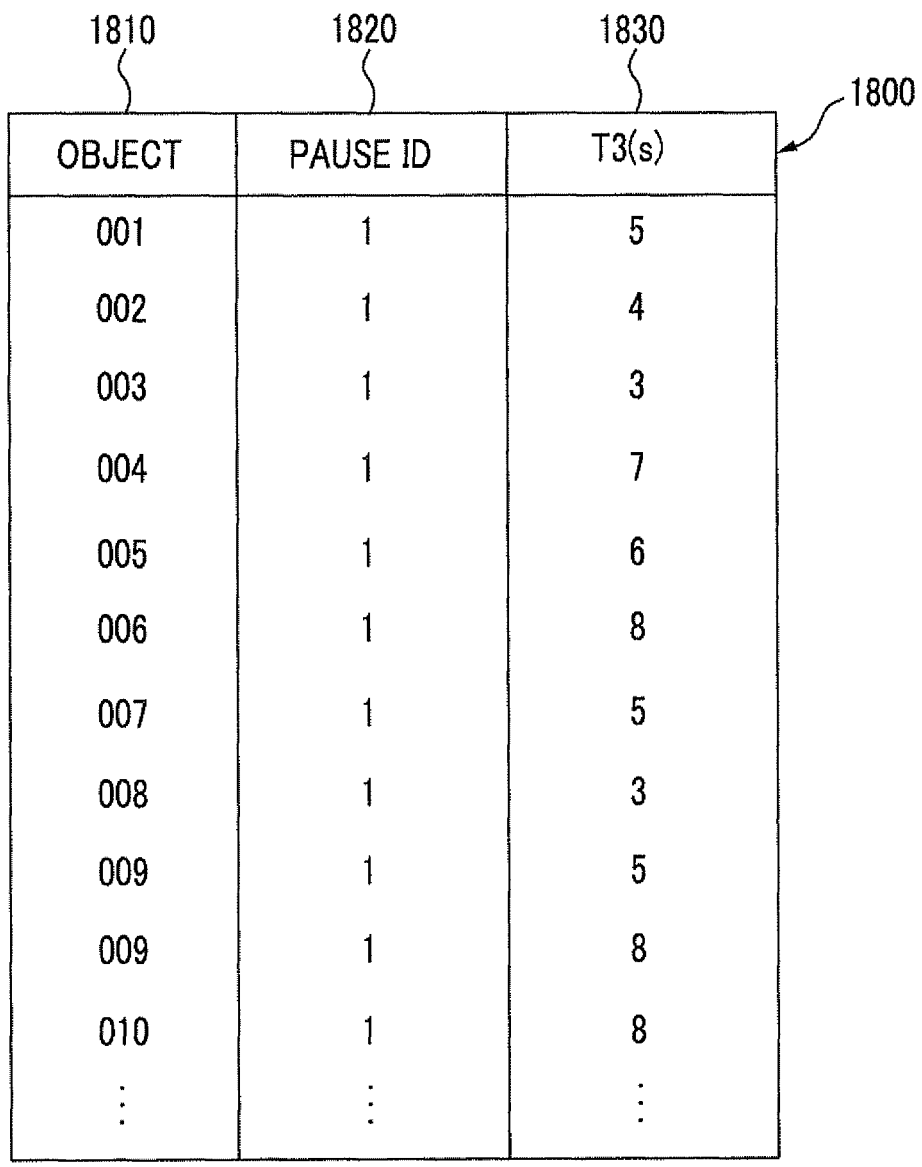
FIG. 18 is a diagram illustrating an example of the data configuration of a standby parameter determination table.

FIG. 18 is a diagram illustrating an example of the data configuration of a standby parameter determination table 1800. The standby parameter determination table 1800 is created from the basic distribution for each attribute shown in FIG. 17. That is, an object, an identification code of a standby, and a standby time are stored to correspond to each other for each attribute.

The standby parameter determination table 1800 includes an object column 1810, a pause ID column 1820, and a T3 (s) column 1830. The object column 1810 stores an object identification code of an object. The pause ID column 1820 stores a standby identification code. The T3 (s) column 1830 stores a standby time.

A process of determining a standby parameter depending on a user's history (log) will be described below with reference to FIGS. 19 and 20. That is, an example of the process of step S1514 will be described.

At what % point in the distribution the standby time (that is, the user's history) due to manual cancelling of a person is located is extracted with reference to the standby time distribution of an object. For example, it is assumed that the standby time of user A is located at a point of 67% in the distribution. In this case, the standby time located at the point of 67% in the distribution of an object is determined as the standby parameter of the object which user A does not undergo yet. In the distribution shown in FIG. 20, since 3.2 seconds is located at the point of 67%, the standby time of user A is set to 3.2 seconds. A distribution table 1900 may be used as the table representing the distribution shown in FIG. 20.

Figure 19:
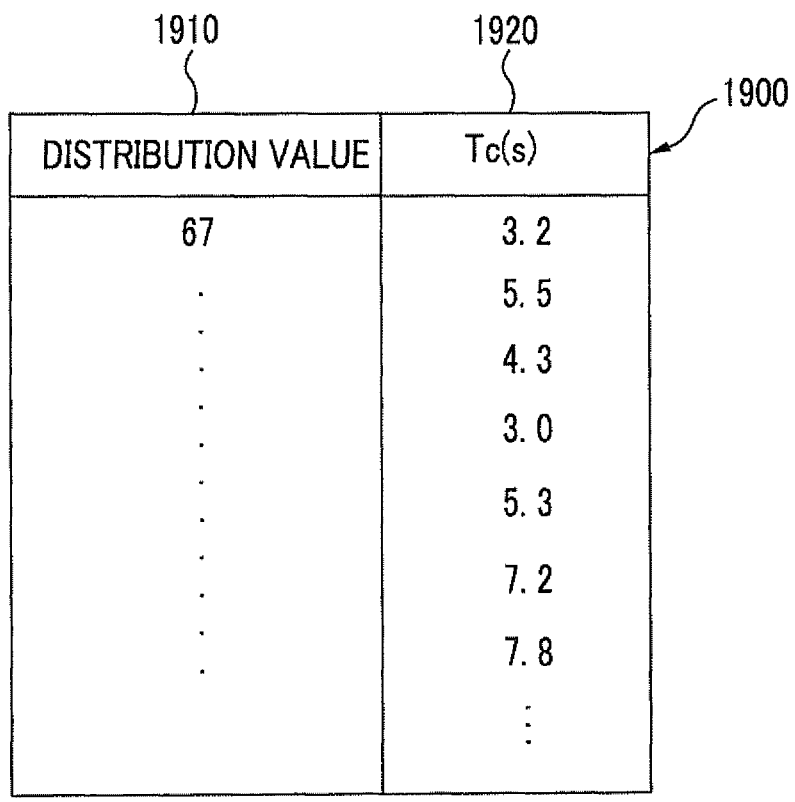
FIG. 19 is a diagram illustrating an example of the data configuration of a distribution table.
Figure 20:
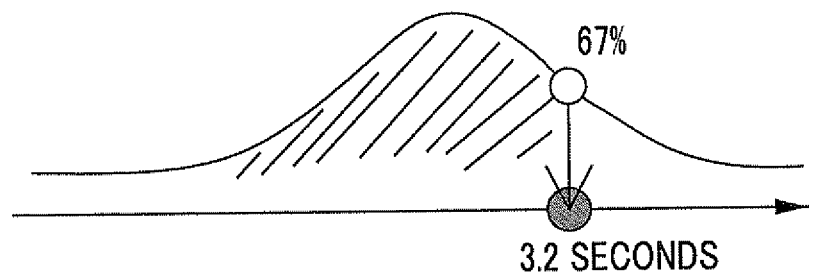
FIG. 20 is a diagram illustrating an example of the setting of a standby time depending on the attributes of an operator.

FIG. 19 is a diagram illustrating an example of the data configuration of the distribution table 1900. The distribution table 1900 includes a distribution value column 1910 and a Tc (s) column 1920. The distribution value column 1910 stores a distribution value and the Tc (s) column 1920 stores the standby time corresponding to the distribution value. The standby time corresponding to 67% in the distribution value column 1910 is extracted from the Tc (s) column 1920 with reference to the distribution table 1900.

In an example of the process of step S1514, the standby time may be changed on the basis of the time of the day.

Figure 21:
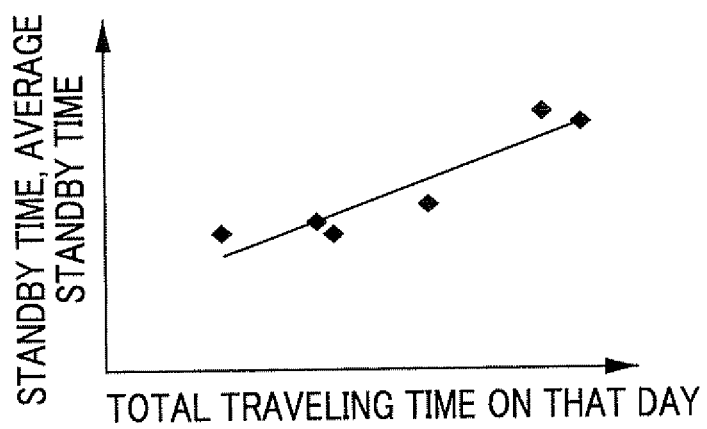
FIG. 21 is a diagram illustrating an example of the setting of a standby time depending on the attributes of an operator.

FIG. 21 is a diagram illustrating an example where the standby time is set depending on an operator's attribute. This is a graph in which a traveling time and a difference of a standby time are plotted with a vertical axis representing the difference of a standby time from an average standby time due to a manual cancelling of a person and a horizontal axis representing the traveling time of that day. In general, as the traveling time of a day increases, a person is tired and the difference of the standby time from the average standby time tends to increase. The correction value may be calculated from this graph by the use of the following expression.

$$y=ax+b$$

Here, y represents the standby time, x represents the traveling time of that day, a is a coefficient, and b represents the average standby time for the attribute.

Figure 22:
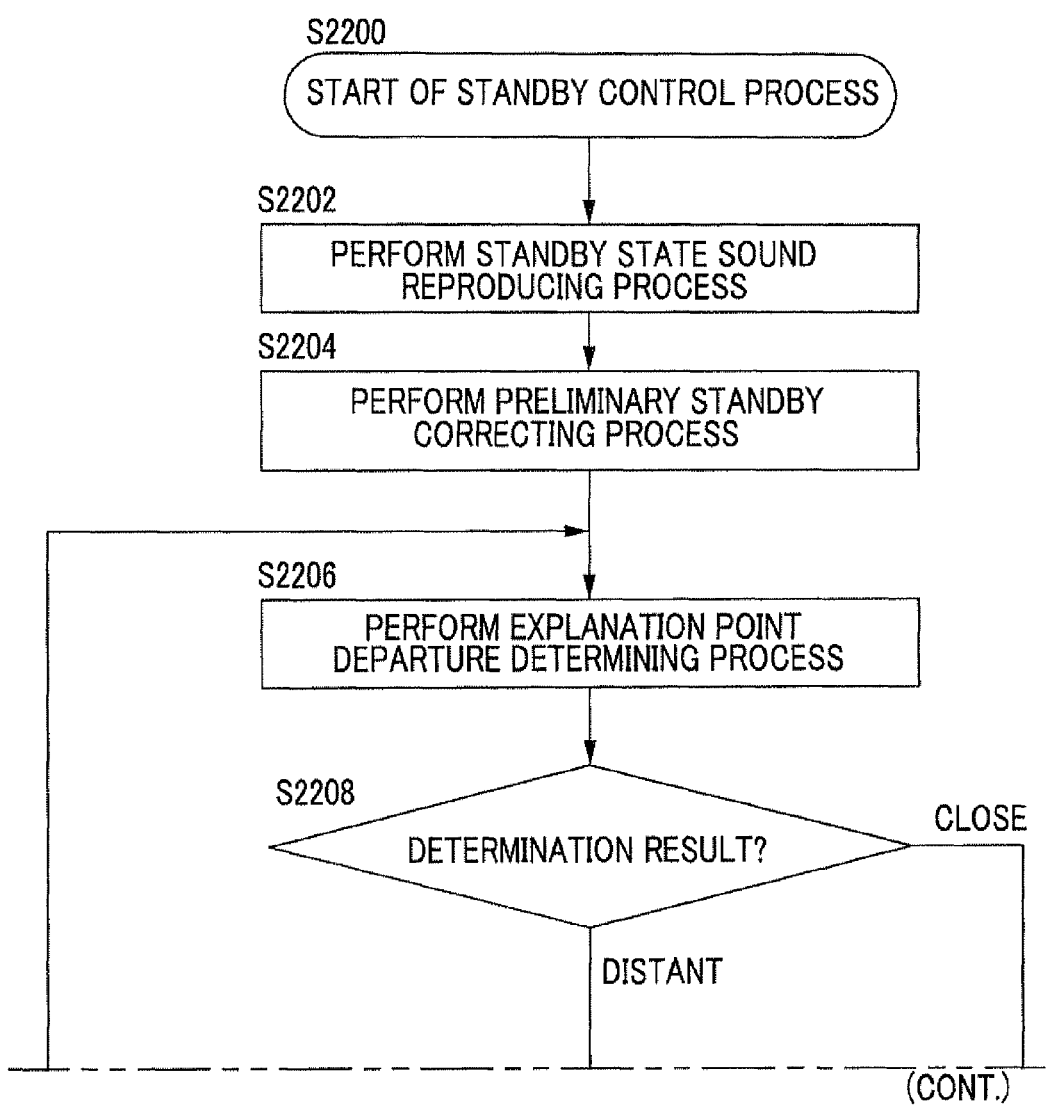
FIG. 22 is a flowchart illustrating an example of a standby control process.

FIG. 22 is a flowchart illustrating an example of a standby control process. This corresponds to the process of step S1516 in the flowchart shown in FIG. 15.

In step S2202, the standby control module 1230 controls the audio content control module 350 to perform a process of reproducing a standby state sound on the basis of the standby parameter (the standby A (BGM) column 1430 or the standby B (BGM) column 1450 in the standby parameter table 1400).

In step S2204, the standby control module 1230 performs a preliminary standby correcting process. For example, the standby control module 1230 may control the standby log analyzing module 1280 to perform the process of step S1514.

In step S2206, the standby control module 1230 performs an explanation point departure determining process. The determination described above with reference to FIG. 8 is performed. That is, when the distance 830 from the user 800 to the explanation point 890 is less than the distance B 920, it is determined that the object is located nearby. Otherwise, it is determined that the object is located distant.

In step S2208, the process of step S2210 is performed when it is determined in step S2206 by the standby control module 1230 that the object is located nearby, and the process of step S2216 is performed when it is determined that the object is located distant.

In step S2210, the standby parameter correcting module 1350 performs the standby parameter correcting process during the standby. As described above, when a conversation is detected by the state detecting module 1270, the standby parameter correcting module 1350 corrects the standby time to be longer. The standby time is corrected on the basis of the number of persons participating in the conversion detected by the state detecting module 1270. For example, when the number of person is greater than a predetermined number, the standby time is corrected to be longer. Alternatively, when the number of persons participating in the conversation increases, the standby time is corrected to be longer. The standby time is corrected to be longer depending on the time in which walking is stopped, which is detected by the state detecting module 1270.

In step S2212, the standby control module 1230 performs a standby cancelling process. The manual standby cancel instructing module 1260 detects whether the play & pause button 110 is pressed or whether the standby time passes. When it is detected that the play & pause button 110 is pressed or that the standby time passes, it is determined that it is instructed to cancel the standby.

When the standby control module 1230 determines that the present time is in the second half of the standby in step S2212 and the state detecting module 1270 detects an action allowing the start of an explanation of the object, it may be determined that it is instructed to cancel the standby.

When an action allowing the start of an explanation of the object is detected but the distance between the position detected by the present position detecting module 310 and the object is greater than or equal to a predetermined distance, the standby control module 1230 may determine that the standby cancelling instruction is not given.

In step S2214, the standby control module 1230 checks the standby cancelling instruction in step S2212, the process of step S2216 is performed when it is determined that the standby cancelling instruction is given, and the process of step S2206 is performed again when it is determined that the standby canceling instruction is not given.

In step S2216, the standby control module 1230 controls the audio content control module 350 to perform a standby state sound stopping process. Then, the process of step S1518 in the flowchart shown in FIG. 15 is performed again. When it is determined in step S2208 that the object is located distant and thus the process of step S2216 is performed, the process of step S1522 in the flowchart shown in FIG. 15 is performed again.

Figure 23A:
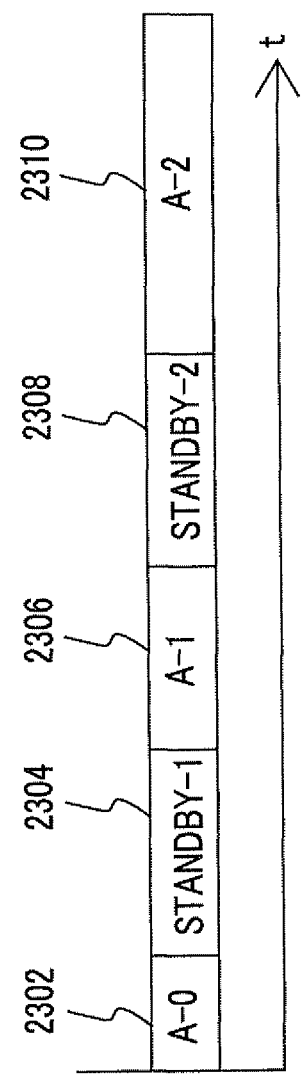
FIGS. 23A and 23B are diagrams illustrating an example of specific processes.
Figure 23B:
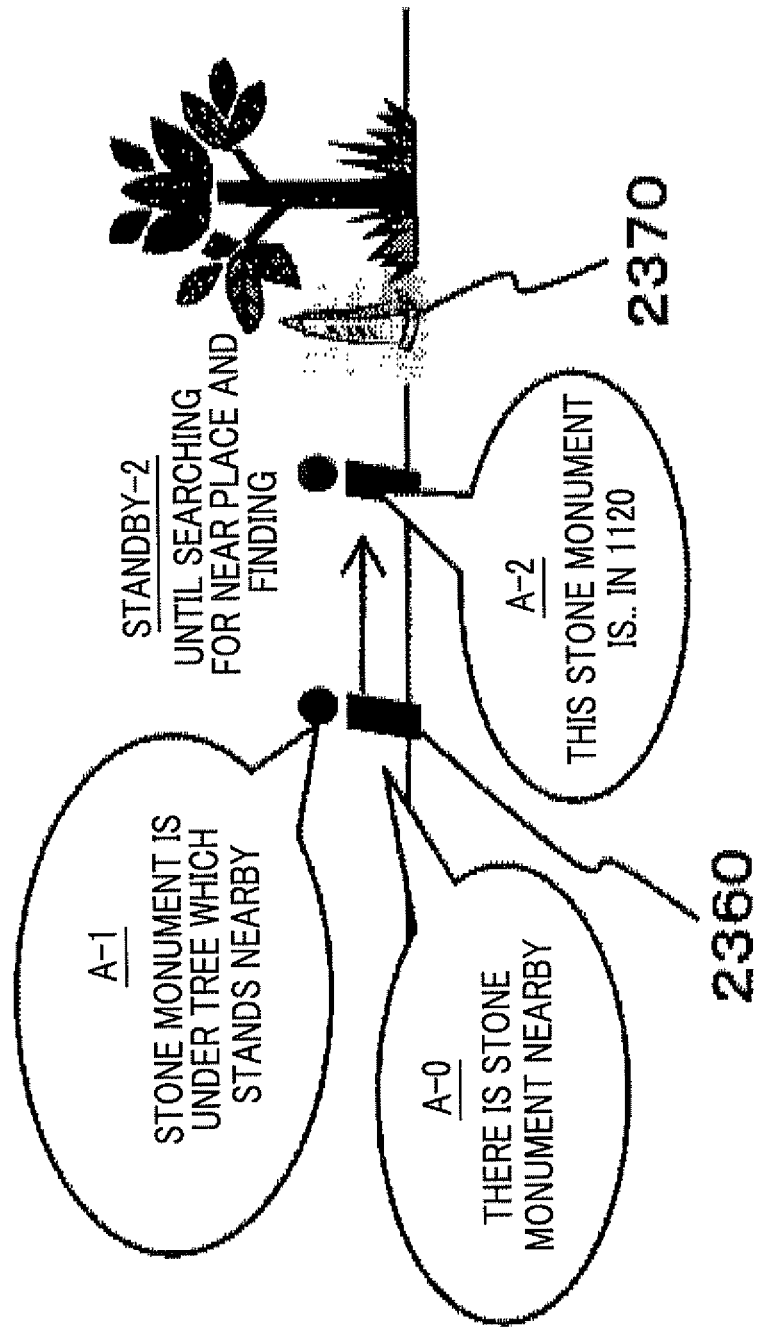

FIGS. 23A and 23B are diagrams illustrating an example of specific processes.

FIG. 23A shows details of a time-series process, where A-0 2302 represents that the first explanation information is reproduced with a sound, standby-1 2304 represents that it is in the first standby state, A-1 2306 represents that the second explanation information is reproduced with a sound, standby-2 2308 represents that it is in the second standby state, and A-2 2310 represents that the third explanation information is reproduced with a sound.

As shown in FIG. 23B, it is assumed that a user 2360 is around an object 2370. This case is determined to be close to step S1512 in the flowchart shown in FIG. 15. A voice, "a stone monument is nearby", as the first explanation information is output from the earphone 160 (A-0 2302 in FIG. 23A).

After the first standby (standby-1 2304 in FIG. 23A), a voice, "the stone monument is under a tree which stands nearby", as the second explanation information is output from the earphone 160 (A-1 2306 in FIG. 23A).

Until the user 2360 searches for the stone monument nearby, that is, after the second standby (standby-2 2308 in FIG. 23A), a voice, "this stone monument is . . . in 1120.", as the third explanation information is output from the earphone 160 (A-2 2310 in FIG. 23A).

The standby-1 2304 and the standby-2 2308 are standby times as standby parameters depending on the user 2360 or the circumstances, the standby times are corrected to be longer or shorter depending on the operator's state or when the operator performs an action described above in the standby times.

FIGS. 24A and 24B are diagrams illustrating an example of the relationship between operations and processes. These processes are performed when a user approaches an object.

In step S2402, the audio content control module 350 reproduces a "notice content" as the first explanation information.

In step S2404, the standby control module 1230 performs a first standby (pause) control.

When the standby control module 1230 cancels the standby state after the first standby time (which may be the first standby time after the standby parameter is corrected) or when the play & pause button 110 of the information terminal 100 is pressed as a play button by the operator in step S2406, the process of step S2408 is performed.

In step S2408, the audio content control module 350 reproduces an "object position explaining content" as the second explanation information.

In step S2410, the standby control module 1230 performs a second standby (pause) control.

When the standby control module 1230 cancels the standby state after the second standby time (which may be the second standby time after the standby parameter is corrected) or when the play & pause button 110 of the information terminal 100 is pressed as a play button by the operator in step S2412, the process of step S2414 is performed.

In step S2414, the audio content control module 350 reproduces an "object details explaining content" as the third explanation information.

In step S2416, the "notice content" is reproduced when the return button 120 of the information terminal 100 is pressed by the operator during the process of step S2402 or S2404. Similarly, the "object position explaining content" is reproduced when the return button 120 of the information terminal 100 is pressed by the operator during the process of step S2408 or S2410. The "object details explaining content" is reproduced when the return button 120 of the information terminal 100 is pressed by the operator during the process of step S2414.

The above-mentioned program may be provided in a state where it is stored on a recoding medium, or the program may be provided via a communication unit. In this case, for example, the program may be understood as an invention of a "computer-readable recording medium having a program recorded thereon".

The "computer-readable recording medium having a program recorded thereon" means a computer-readable recording medium having a program recorded thereon, which is used to install, execute, and distribute the program.

Examples of the recording medium include digital versatile discs such as "a DVD-R, a DVD-RW, and a DVD-RAM" with a standard defined in the DVD forum, compact discs (CD) such as a CD-ROM, a CD-R, and a CD-RW, a Blu-ray Disc (registered trademark), an optical-magnetic disc (MO), a flexible disk (FD), a magnetic tape, a hard disk, a read only memory (ROM), an electrical erasable and programmable read only memory (EEPROM (registered trademark)), a flash memory, a random access memory (RAM), and an secure digital (SD) memory card.

The program or a part thereof may be recorded on the recording medium and then may be conserved or distributed. By communications, for example, via a transmission medium such as a wired network or a wireless communication network used for a local area network (LAN), a metropolitan area network (MAN), a wide area network (WAN), the Internet, an intranet, an extranet, and the like or combinations thereof, the program may be transmitted, or may be carried through the use of carrier waves.

The program may be a part of another program or may be recorded on a recording medium along another program. The program may be divided and recorded on plural recording mediums. The program may be recorded in any form, as long as it can be restored from a compressed and encoded state.

The exemplary embodiments may be understood as the following inventions. The following inventions may be combined with the inventions described in the appended claims.

(A1) An information processing apparatus including:

a receiver unit that receives attributes relevant to an operator or circumstances of the operator;

an extraction unit that extracts standby information used to give an explanation to the operator from a standby information storage unit, which stores the attributes and standby information as information on a standby between an explanation and a subsequent explanation in correlation with each other, on the basis of the attributes received by the receiver unit;

an explanation information storage unit that stores explanation information;

a generation unit that reproduces the explanation information with a sound stored in the explanation information storage unit;

a detection unit that detects a state of the operator;

a correction unit that corrects the standby information extracted by the extraction unit on the basis of the state of the operator detected by the detection unit; and a control unit that controls the time until subsequent explanation information is reproduced with a sound after explanation information is fully reproduced by the generation unit on the basis of the standby information corrected by the correction unit.

(A2) The information processing apparatus according to (A1), wherein the explanation information storage unit stores first explanation information on a first explanation of an object, second explanation information on a second explanation, and third explanation information on a third explanation, wherein the first explanation information is information on an explanation preliminarily given when explaining the object, wherein the second explanation information is information on an explanation given after the first explanation and an explanation for causing an operator to search for the object, wherein the third explanation information is information on an explanation after the second explanation and an explanation of the object, wherein the standby information storage unit stores first standby information which is information on a first standby and second standby information which is information on a second standby, wherein the first standby is between the first explanation and the second explanation, wherein the second standby is between the second explanation and the third explanation, wherein the extraction unit extracts the first standby information and the second standby information from the standby information storage unit, wherein the detection unit detects a first state of the operator in the first standby and detects a second state of the operator in the second standby, wherein the correction unit corrects the first standby information on the basis of the first state and corrects the second standby information on the basis of the second state, and wherein the control unit controls the standby between the first explanation and the second explanation from the generation unit on the basis of the first standby information corrected by the correction unit and controls the standby between the second explanation and the third explanation from the generation unit.

(A3) The information processing apparatus according to (A1) or (A2), wherein the detection unit detects a conversation or the number of persons participating in the conversation, and wherein the correction unit corrects a standby time to be longer or corrects the standby time depending on the number of persons participating in the conversation detected by the detection unit when the detection unit detects that the conversation is carried out.

(A4) The information processing apparatus according to any one of (A1) to (A3), wherein the detection unit detects the time in which the operator stops walking, and wherein the correction unit corrects the standby time to be longer depending on the time in which the operator stops walking, which is detected by the detection unit.

(A5) The information processing apparatus according to any one of (A1) to (A4), wherein the control unit cancels the standby and starts a subsequent explanation when a predetermined action is detected by the detection unit in a period of time under the standby from a predetermined time point to the subsequent explanation.

(A6) The information processing apparatus according to (A5), further including a position detecting unit that detects the position of the information processing apparatus, wherein the control unit does not cancel the standby when the position detected by the position detecting unit is a predetermined position.

(A7) The information processing apparatus according to any one of (A1) to (A6), wherein the control unit controls the generation unit to reproduce a sound indicating the standby between an explanation and a subsequent explanation.

(A8) An information processing system including an information processing apparatus and a standby information storage unit, wherein the standby information storage unit stores attributes relevant to an operator or circumstances of the operator and standby information which is information on a standby between an explanation and a subsequent explanation in correlation with each other, wherein the information processing apparatus includes:

a receiver unit that receives the attributes;

an extraction unit that extracts the standby information used to give an explanation to the operator from the standby information storage unit on the basis of the attributes received by the receiver unit;

an explanation information storage unit that stores explanation information;

a generation unit that reproduces the explanation information with a sound stored in the explanation information storage unit;

a detection unit that detects a state of the operator;

a correction unit that corrects the standby information extracted by the extraction unit on the basis of the state of the operator detected by the detection unit; and a control unit that controls the time until subsequent explanation information is reproduced with a sound after explanation information is fully reproduced by the generation unit.

(A9) An information processing program causing a computer to function as:

a receiver unit that receives attributes relevant to an operator or circumstances of the operator;

an extraction unit that extracts standby information used to give an explanation to the operator from a standby information storage unit, which stores the attributes and standby information as information on a standby between an explanation and a subsequent explanation in correlation with each other, on the basis of the attributes received by the receiver unit;

an explanation information storage unit that stores explanation information;

a generation unit that reproduces the explanation information with a sound stored in the explanation information storage unit;

a detection unit that detects a state of the operator;

a correction unit that corrects the standby information extracted by the extraction unit on the basis of the state of the operator detected by the detection unit; and a control unit that controls the time until subsequent explanation information is reproduced with a sound after explanation information is fully reproduced by the generation unit.

According to the information processing apparatus of (A1), it is possible to suppress generation of a second explanatory sound even in a state where it is not suitable to give an explanation to an operator when a first explanatory sound and the second explanatory sound are reproduced, compared with a case not employing this configuration.

According to the information processing apparatus of (A2), it is possible to control the first standby depending on the first state of the operator in the first standby and to control the second standby depending on the second state of the operator in the second standby.

According to the information processing apparatus of (A3), it is possible to correct the standby time depending on a conversation or the number of persons participating in the conversation.

According to the information processing apparatus of (A4), it is possible to correct the standby time depending on the walking of the operator.

According to the information processing apparatus of (A5), it is possible to cancel the standby depending on the operator's action.

According to the information processing apparatus of (A6), it is possible to inhibit the cancel of the standby when the information processing apparatus is located at predetermined position.

According to the information processing apparatus of (A7), it is possible to determine whether the operator is in a standby.

According to the information processing system of (A8), it is possible to suppress generation of a second explanatory sound even in a state where it is not suitable to give an explanation to an operator when a first explanatory sound and the second explanatory sound are reproduced, compared with a case not employing this configuration.

According to the information processing program of (A9), it is possible to suppress generation of a second explanatory sound even in a state where it is not suitable to give an explanation to an operator when a first explanatory sound and the second explanatory sound are reproduced, compared with a case not employing this configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor adapted to control:
a position detector, wherein the position detector detects a position of the information processing apparatus;
an explanation information storage device, wherein the explanation information storage device stores explanation position information which is information of a position to be explained and explanation information to correspond to each other;
a generator, wherein the generator extracts the explanation information corresponding to a first explanation position from the explanation information storage device and reproduces the extracted explanation information with a sound when the first explanation position which is a position to be explained is detected within a first distance which is a predetermined distance from the position detected by the position detector; and
a group determinator, wherein the group determinator determines whether or not the first explanation position belongs to the same group as a second explanation position when the second explanation position which is a position to be explained and which is a position different from the first explanation position is detected within the first distance from the position detected by the position detector after the generator starts the generating of the explanation information corresponding to the first explanation position with a sound, wherein the generator continues to reproduce the explanation information with a sound when the group determinator determines that both explanation positions belong to the same group.

2. The information processing apparatus according to claim 1, wherein the generator reproduces the explanation information corresponding to the second explanation position with a sound when the group determinator determines that both explanation positions do not belong to the same group.

3. The information processing apparatus according to claim 2, wherein the generator stops generating the explanation information corresponding to the first explanation position or the second explanation position with a sound when the position detected by the position detecting unit is separated equal to or greater than a second distance which is a predetermined distance from the first explanation position or the second explanation position, wherein the generator continues to reproduce the explanation information corresponding to the first explanation position with a sound when the position detected by the position detector is separated greater than the first distance but less than the second distance from the first explanation position and is separated less than the first distance from the second explanation position and the group determinator determines that both explanation positions belong to the same group, and wherein the second distance is greater than the first distance.

4. The information processing apparatus according to claim 3, further comprising:

a receiver, wherein the receiver receives information on an operator or circumstances of the operator; and a switcher, wherein the switcher changes the first distance or the second distance on the basis of attributes of the information received by the receiver.

5. The information processing apparatus according to claim 2, further comprising:

a receiver, wherein the receiver receives information of an operator or circumstances of the operator; and a switcher, wherein the switcher changes the first distance or the second distance on the basis of attributes of the information received by the receiver.

6. The information processing apparatus according to claim 1, wherein the generator stops generating the explanation information corresponding to the first explanation position or the second explanation position with a sound when the position detected by the position detector is separated equal to or greater than a second distance which is a predetermined distance from the first explanation position or the second explanation position, wherein the generator continues to reproduce the explanation information corresponding to the first explanation position with a sound when the position detected by the position detector is separated greater than the first distance but less than the second distance from the first explanation position and is separated less than the first distance from the second explanation position and the group determinator determines that both explanation positions belong to the same group, and wherein the second distance is greater than the first distance.

7. The information processing apparatus according to claim 6, further comprising:

a receiver, wherein the receiver receives information on an operator or circumstances of the operator; and a switcher, wherein the switcher changes the first distance or the second distance on the basis of attributes of the information received by the receiver.

8. The information processing apparatus according to claim 1, further comprising:

a receiver, wherein the receiver receives information on an operator or circumstances of the operator; and a switcher, wherein the switcher changes the first distance or the second distance on the basis of attributes of the information received by the receiver.

9. The information processing apparatus according to claim 1, wherein the explanation information storage device stores explanation information that explains about an explanation object, and the explanation information corresponding to the first explanation position and the explanation information corresponding to the second explanation position both explain a same object.

10. A non-transitory computer-readable recording medium having recorded thereon an information processing program causing a computer to function as:

a position detector, wherein the position detector detects a position of the information processing apparatus;

an explanation information storage device, wherein the explanation information storage device stores explanation position information which is information of a position to be explained and explanation information to correspond to each other;

a generator, wherein the generator extracts the explanation information corresponding to a first explanation position from the explanation information storage unit and reproduces the extracted explanation information with a sound when the first explanation position which is a position to be explained is detected within a first distance which is a predetermined distance from the position detected by the position detector; and a group determinator, wherein the group determinator determines whether or not the first explanation position belongs to the same group as a second explanation position when the second explanation position which is a position to be explained and which is a position different from the first explanation position is detected within the first distance from the position detected by the position detector after the generator starts the generating of the explanation information corresponding to the first explanation position with a sound, wherein the generator continues to reproduce the explanation information with a sound when the group determinator determines that both explanation positions belong to the same group.

11. An information processing method comprising:

detecting the position of the information processing apparatus;

storing explanation position information which is information of a position to be explained and explanation information to correspond to each other;

extracting the explanation information corresponding to a first explanation position and reproduces the extracted explanation information with a sound when the first explanation position which is a position to be explained is detected within a first distance which is a predetermined distance from the detected position; and determining whether or not the first explanation position belongs to the same group as a second explanation position when the second explanation position which is a position to be explained and which is a position different from the first explanation position is detected within the first distance from the detected position after the generating of the explanation information corresponding to the first explanation position with a sound is started,
wherein the explanation information is continuously reproduced with a sound when both explanation positions belong to the same group is detected.

* * * * *